United States Patent
Matsushita et al.

(10) Patent No.: US 10,066,924 B2
(45) Date of Patent: Sep. 4, 2018

(54) DISPLACEMENT DETECTION APPARATUS

(71) Applicant: DMG MORI CO., LTD., Yamato-Koriyama, Nara (JP)

(72) Inventors: Kenji Matsushita, Isehara (JP); Yusuke Nakamura, Isehara (JP); Yasuhito Nomoto, Isehara (JP); Shun Katoh, Isehara (JP)

(73) Assignee: DMG MORI CO., LTD., Yamato-Koriyama (JP)

( * ) Notice: Subject to any disclaimer, the term of this patent is extended or adjusted under 35 U.S.C. 154(b) by 0 days.

(21) Appl. No.: 15/601,274

(22) Filed: May 22, 2017

(65) Prior Publication Data
US 2017/0350689 A1 Dec. 7, 2017

(30) Foreign Application Priority Data
Jun. 2, 2016 (JP) ................................. 2016-111342

(51) Int. Cl.
| | |
|---|---|
| *G01B 9/02* | (2006.01) |
| *G01D 5/38* | (2006.01) |
| *G01B 11/00* | (2006.01) |
| *G01D 5/00* | (2006.01) |

(52) U.S. Cl.
CPC ..... *G01B 9/02061* (2013.01); *G01B 9/02038* (2013.01); *G01B 11/002* (2013.01); *G01D 5/00* (2013.01); *G01D 5/38* (2013.01); *G01B 2290/30* (2013.01)

(58) Field of Classification Search
CPC .............. G01B 11/002; G01B 9/02038; G01B 2290/30; G01B 9/02061; G01D 5/00; G01D 5/38
See application file for complete search history.

(56) References Cited

U.S. PATENT DOCUMENTS

| | | | |
|---|---|---|---|
| 4,930,895 A * | 6/1990 | Nishimura | G01D 5/38 356/494 |
| 5,038,032 A * | 8/1991 | Nishimura | G01D 5/38 250/231.16 |
| 5,127,035 A * | 6/1992 | Ishii | G01D 5/24404 250/231.13 |
| 5,485,407 A | 1/1996 | Ishimoto et al. | |
| 8,687,202 B2 | 4/2014 | Tamiya | |

(Continued)

FOREIGN PATENT DOCUMENTS

| | | |
|---|---|---|
| JP | H06-167354 A | 6/1994 |
| JP | H08-201110 A | 8/1996 |
| JP | 2012-002787 A | 1/2012 |

*Primary Examiner* — Dominic J Bologna
(74) *Attorney, Agent, or Firm* — Oliff PLC

(57) ABSTRACT

A displacement detection apparatus can reduce a measurement error even when a diffraction grating is displaced and/or tilted to a direction other than the measurement direction. A displacement detection apparatus includes a light source which emits light, a luminous flux-splitting section, a diffraction grating, a diffracted light-reflecting section, a correcting lens, a luminous flux-coupling section, and a light-receiving section. The diffracted light-reflecting section reflects a first luminous flux and a second luminous flux so as to be perpendicular to one of measuring planes of the diffraction grating and be parallel to each other. The correcting lens is arranged between the diffracted light-reflecting section and the diffraction grating.

9 Claims, 23 Drawing Sheets

(56) References Cited

U.S. PATENT DOCUMENTS

| | | | |
|---|---|---|---|
| 9,074,861 B2* | 7/2015 | Tamiya | G01B 9/02015 |
| 2003/0098411 A1* | 5/2003 | Lee | G01D 5/38 |
| | | | 250/237 G |
| 2004/0155179 A1* | 8/2004 | Lee | G01D 5/38 |
| | | | 250/237 G |
| 2006/0139654 A1* | 6/2006 | Takahashi | G01D 5/38 |
| | | | 356/494 |
| 2011/0310396 A1 | 12/2011 | Tamiya | |
| 2012/0287441 A1* | 11/2012 | Kuroda | G01B 11/02 |
| | | | 356/499 |
| 2016/0223317 A1* | 8/2016 | Suzuki | G01B 9/0209 |

* cited by examiner

DISPLACEMENT DETECTION APPARATUS

BACKGROUND OF THE INVENTION

Field of the Invention:

The present invention relates to a displacement detection apparatus using a grating interferometer.

Description of the Related Art:

Conventionally, there is widely used, as the measuring instrument that performs accurate measurement of a linear displacement or a rotational displacement, an apparatus that optically performs displacement measurement by the use of a grating having a periodic light and dark pattern or a periodic unevenness formed therein and a light source such as an LED. In recent years, a high-resolution displacement detection apparatus capable of measuring the displacement equal to or less than 1 nm has been required especially in semiconductor manufacturing equipment.

The examples of such a conventional type displacement detection apparatus include the one described in, for example, Patent Literature 1. In the displacement detection apparatus described in Patent Literature 1, the light emitted from a light source is caused to vertically enter a diffraction grating to thereby generate two diffracted light beams. Furthermore, the diffracted light beam is again caused to thereby enter the diffraction grating to generate twice-diffracted light beam. Then, the two twice-diffracted light beams are superimposed to give interference light beam. Then, a displacement of the diffraction grating is detected by receiving the interference light beam by the use of a light-receiving element.

RELATED ART DOCUMENT

Patent Document

Patent Literature 1: Japanese Laid-Open Patent Publication No. 2012-2787

SUMMARY OF THE INVENTION

Problems to be Solved by the Invention

However, the conventional displacement detection apparatus described in Patent Literature 1 has a problem that a measurement error is generated when the diffraction grating is displaced or tilted in a direction other than the measurement direction.

The present invention has been made in view of the above circumstances. An object of the present invention is to provide a displacement detection apparatus that can reduce a measurement error even when a diffraction grating is displaced and/or tilted in a direction other than the measurement direction.

Means for Solving the Problem

In order to solve the above-described problem and achieve the object of the present invention, a displacement detection apparatus of the present invention includes a light source, a luminous flux-splitting section, a diffraction grating, a first mirror, a second mirror, a diffracted light-reflecting section, a correcting lens, a luminous flux-coupling section, and a light-receiving section. The light source emits light. The luminous flux-splitting section splits the light emitted from the light source into a first luminous flux and a second luminous flux. The diffraction grating diffracts the first luminous flux and the second luminous flux split by the luminous flux-splitting section. The first mirror causes the first luminous flux split by the luminous flux-splitting section to enter the diffraction grating at a predetermined angle. The second mirror causes the second luminous flux split by the luminous flux-splitting section to enter the diffraction grating at a predetermined angle. The diffracted light-reflecting section reflects the first luminous flux and the second luminous flux diffracted by the diffraction grating, and causes the same to enter again the diffraction grating. The correcting lens is arranged between the diffracted light-reflecting section and the diffraction grating. The luminous flux-coupling section superimposes the first luminous flux and the second luminous flux which are diffracted again by the diffraction grating. The light-receiving section receives interference light beam of the first luminous flux and the second luminous flux superimposed by the luminous flux-coupling section. The diffracted light-reflecting section has a reflective plane arranged parallel to the measuring plane of the diffraction grating. In addition, the correcting lens is arranged so that the central axis thereof becomes perpendicular to the measuring plane of the diffraction grating.

Effects of the Invention

By the use of the displacement detection apparatus of the present invention, it is possible to reduce a measurement error even if the diffraction grating is tilted and the attitude thereof changes.

DESCRIPTION OF THE PREFERRED EMBODIMENTS

Hereinafter, the exemplary embodiments of a displacement detection apparatus of the present invention will be explained with reference to FIG. 1 to FIG. 33B. Note that the same reference sign is attached to a member common in each view. Furthermore, the present invention is not limited to the following embodiments.

Moreover, various kinds of lens given in the following explanation may be a single lens or be a lens group.

1. First Exemplary Embodiment 1-1. Configuration Example of Displacement Detection Apparatus First, the configuration of a first exemplary embodiment (hereinafter, referred to as "the example") of the displacement detection apparatus of the present invention will be explained according to FIG. 1 to FIG. 3.

Figure 1:
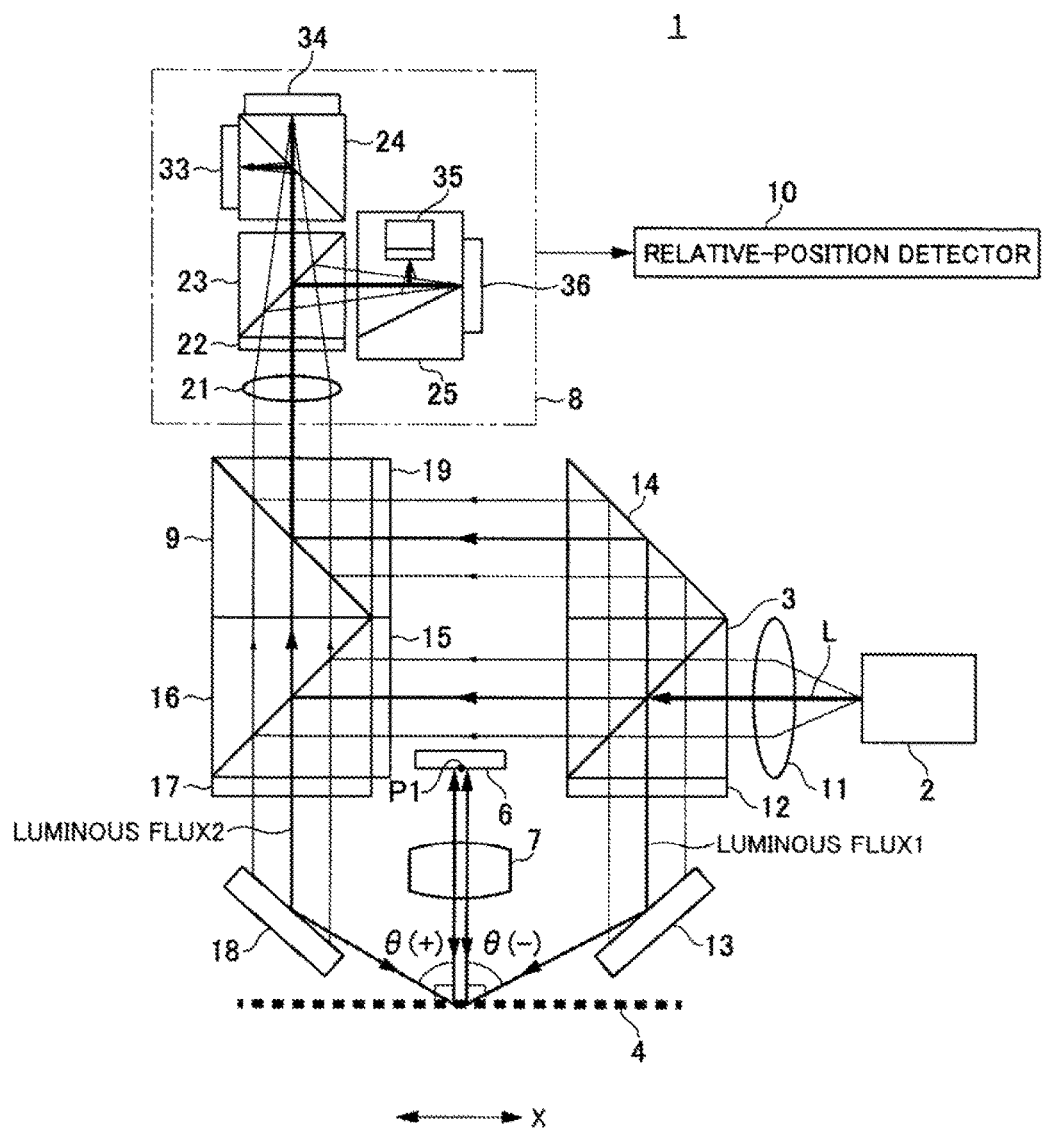
FIG. 1 is a schematic configuration diagram illustrating the configuration of a displacement detection apparatus according to a first exemplary embodiment of the present invention.
Figure 2A:
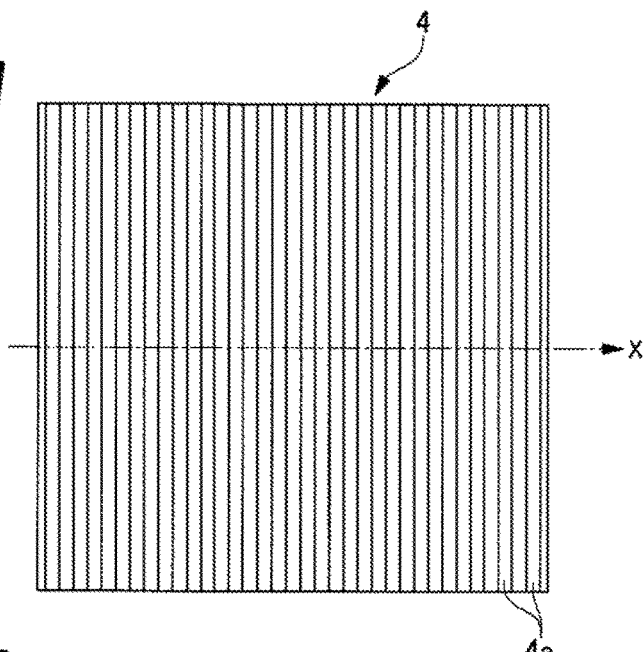
FIGS. 2A and 2B are diagrams illustrating an example of a diffraction grating in the displacement detection apparatus according to the first exemplary embodiment of the present invention.
Figure 2B:
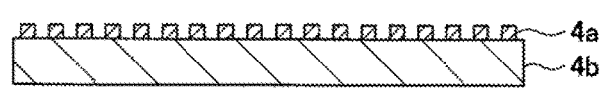
Figure 3:
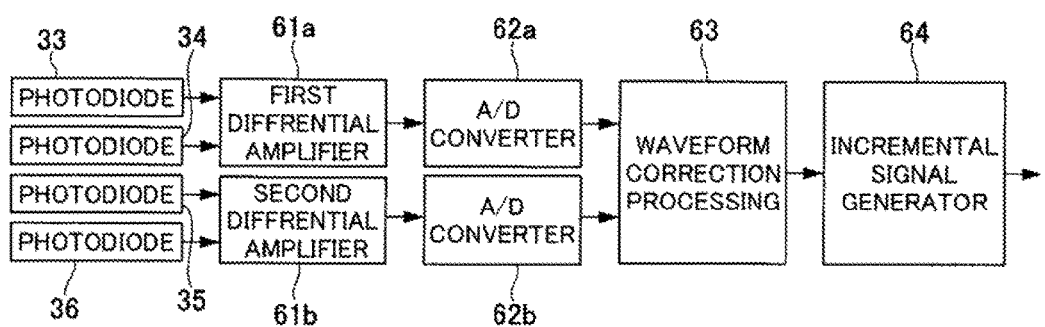
FIG. 3 is the block diagram illustrating a relative-position detector of the displacement detection apparatus according to the first exemplary embodiment of the present invention.
Figure 4:
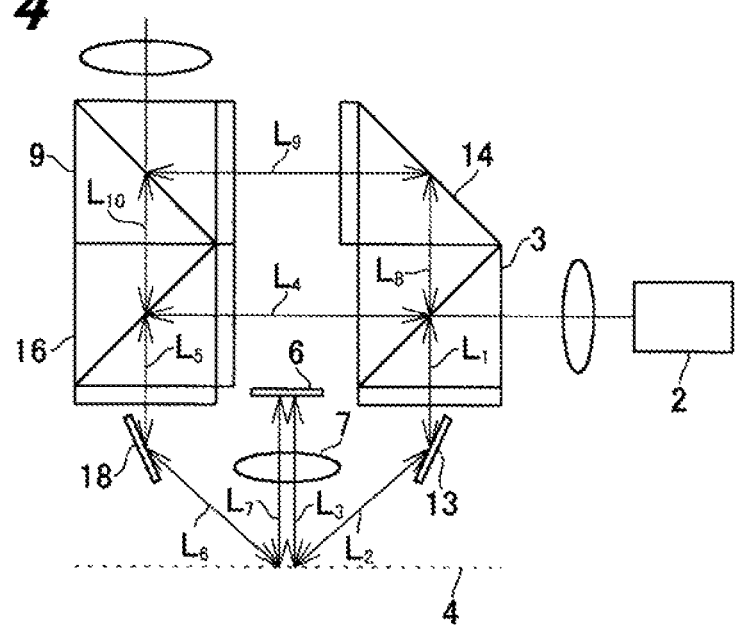
FIG. 4 is an explanatory view illustrating an optical path length from a luminous flux-splitting section to a light-receiving section in the displacement detection apparatus according to the first exemplary embodiment of the present invention.

FIG. 1 is a schematic configuration diagram illustrating the configuration of the displacement detection apparatus, FIGS. 2A-2B are diagrams illustrating an example of a diffraction grating of the displacement detection apparatus, and FIG. 3 is a block diagram illustrating the schematic configuration of a relative-position detector in the displacement detection apparatus. In addition, FIG. 4 is an explanatory view illustrating an optical path length of the displacement detection apparatus.

A displacement detection apparatus 1 of the example is an apparatus that detects a displacement in one direction of the diffraction grating, and that detects a displacement in the X direction in the case of FIG. 1.

Hereinafter, the embodiment will be explained by the use of FIG. 1 to FIG. 4.

A diverging light beam emitted from a light source 2 is converted to a collimate beam by a lens 11. A light source having a relatively short coherence length is used as the light source 2, although the light source 2 is a coherent light source such as a multimode laser diode or a super-luminescent diode. However, the light source is not necessarily limited to these specific types of light sources. The coherence length as used herein is the optical path length difference of a luminous flux when the interference light intensity becomes equal to or less than approximately $1/e^2$ of the peak.

The light source may be placed at the position of the light source 2 illustrated in FIG. 1. Alternatively, the light source is installed at a separated place in order to avoid the influence of the heat generation of the light source, the light is caused to propagate through an optical fiber, and an exit end of the optical fiber may be placed at the position of the light source 2 illustrated in FIG. 1. Also in the case, the diverging light beam emitted from the optical fiber is converted to a collimate beam by the lens 11. When the beam from the light source is linearly-polarized light beam, an optical fiber to be used includes one, such as a polarization-maintaining fiber, capable of holding the polarization plane.

The light beam converted to a collimate beam by the lens 11 enters a luminous flux-splitting section including a polarizing beam splitter 3. When the light emitted from the light source 2 is linearly-polarized light beam, the polarization direction of the incident light is adapted to become 45° with respect to the transmission polarization direction (P-polarized light beam) of a polarizing beam splitter. When the linearly-polarized light beam emitted from the light source 2 is converted to circularly-polarized light by the use of a quarter-wave plate, and/or when the emitted light is originally non-polarized light beam or circularly-polarized light beam, there is no need to set the angle about the optical axis of a light source to a specific direction. In either case, the light beam is split into two beams toward the transmission side and reflection side at the intensity ratio 1:1, by the polarizing beam splitter 3.

A luminous flux L1 of the S-polarized light beam emitted to the reflection side of the polarizing beam splitter 3 is converted to circularly-polarized light beam by a quarter-wave plate 12. The luminous flux L1 is reflected by a mirror 13 to enter a diffraction grating 4 at an angle satisfying Formula 1.

$$\theta = \text{SIN}^{-1}\left(\frac{-\lambda}{\Lambda}\right) \quad \text{[Formula 1]}$$

Where $\Lambda$: grating pitch, $\lambda$: wavelength of incident light, $\theta$: incident angle (counterclockwise rotation is defined as positive when the angle is measured from the normal of the grating to a light beam). The luminous flux 1 is diffracted by the diffraction grating 4, and the −1st order light beam is emitted in a direction perpendicular to the grating plane of the diffraction grating 4.

FIG. 2B illustrates a cross-sectional structure of the diffraction grating 4. The diffraction grating 4 has the structure in which projection structures 4a are arranged side by side at a fixed cycle A on a substrate 4b in the X direction. Furthermore, as illustrated in FIG. 2A, the projection structure 4a extends in the direction perpendicular to the x axis while having the same cross-sectional shape. The cross-sectional shape of the projection structure 4a is optimized so that the intensities of the +/−1st order diffracted light beams become the maximum.

A luminous flux L2 of the P-polarized light beam emitted to the transmission side of the polarizing beam splitter 3 passes through a half-wave plate 15 placed between the polarizing beam splitter 3 and a polarizing beam splitter 16 and is converted from the P-polarized light beam to the S-polarized light beam. The luminous flux L2 converted to the S-polarized light beam is reflected by the polarizing beam splitter 16 and passes through a quarter-wave plate 17 to be converted to circularly-polarized light beam. The luminous flux L2 is reflected by a mirror 18 to enter the diffraction grating 4 at an angle satisfying Formula 2.

$$\theta = \text{SIN}^{-1}\left(\frac{+\lambda}{\Lambda}\right) \quad \text{[Formula 2]}$$

The luminous flux L2 is diffracted by the diffraction grating 4, and the +1st order light beam is emitted in the direction perpendicular to the grating plane of the diffraction grating 4.

The incident points of the luminous flux L1 and the luminous flux L2 on the diffraction grating 4 are set to be an approximately identical point. Although, in FIG. 1, for the purpose of separately explaining the optical paths of the luminous flux 1 and the luminous flux 2, the incident points of the luminous flux 1 and the luminous flux 2 on the diffraction grating 4 are illustrated so as to differ, the incident points are set to be as close as possible.

The polarizing beam splitter 3, the polarizing beam splitter 16, and the mirrors 13 and 18 are arranged so that an optical path length ($L_4+L_5+L_6+L_7$) of the luminous flux 2 from the splitting plane of the polarizing beam splitter 3 to a mirror 6 becomes longer by $\Delta L$ than an optical path length ($L_1+L_2+L_3$) of the luminous flux 1 from the splitting plane of the polarizing beam splitter 3 to the mirror 6 (refer to FIG. 4).

The luminous flux 1 and the luminous flux 2 are caused to enter horizontally symmetrically with respect to the axis erected perpendicular to the grating plane of the diffraction grating 4. Therefore, $L_4=\Delta L$ is established since $L_1=L_5$, $L_2=L_6$, and $L_3=L_7$ are established. The optical path length as used herein is not a simple distance, but is the distance of a path on which a light beam travels, multiplied by the refractive index of a substance through which the light beam passes. The optical path length difference can be adjusted by an interval between the polarizing beam splitter 3 and the polarizing beam splitter 16.

The luminous flux 1 and the luminous flux 2 diffracted by the diffraction grating 4 pass, in a substantially superimposed state, through a correcting lens 7 that corrects the optical paths of the luminous flux 1 and the luminous flux 2 when the diffraction grating is tilted, and are then reflected by the diffracted light-reflecting section including the mirror 6 to travel back through the original optical path. The central axis of the lens 7 is set so as to be perpendicular to the grating plane of the diffraction grating 4, and is aligned with the symmetrical axis of the optical path of the luminous flux 1 from the mirror 13 to the diffraction grating 4, and of the optical path of the luminous flux 2 from the mirror 18 to the diffraction grating 4.

Furthermore, the lens 7 is arranged so that one focus position thereof is located on the grating plane of the diffraction grating 4 and another focus position is located on the reflective plane of the mirror 6 (the action of the lens 7 will be described later).

The luminous flux 1 is again diffracted by the diffraction grating 4 to pass through the quarter-wave plate 12, whereas the luminous flux 2 is again diffracted by the diffraction grating 4 to pass through the quarter-wave plate 17.

The luminous flux 1 having passed through again the quarter-wave plate 12 is converted from the circularly-polarized light beam to the P-polarized light beam, passes through the polarizing beam splitter 3, is then reflected by a mirror 14, and passes through a half-wave plate 19 arranged between the mirror 14 and a polarizing beam splitter 9 to be converted from the P-polarized light beam to the S-polarized light beam. The luminous flux 1 converted to the S-polarized light beam is reflected by the luminous flux-coupling section including the polarizing beam splitter 9 to travel toward a light-receiving section 8.

On the other hand, the luminous flux 2 having passed through again the quarter-wave plate 17 is converted from the circularly-polarized light beam to the P-polarized light beam, and travels toward the light-receiving section 8 through the polarizing beam splitter 16 and the polarizing beam splitter 9.

The mirror 14 and the polarizing beam splitter 9 are arranged so that an optical path length ($L_8+L_9$) of the luminous flux 1 from the splitting plane of the polarizing beam splitter 3 to the splitting plane of the polarizing beam splitter 9 becomes longer by $\Delta L$ than the optical path length ($L_{10}$) of the luminous flux 2 from the splitting plane of the polarizing beam splitter 16 to the splitting plane of the polarizing beam splitter 9 ($L_8+L_9=L_{10}+\Delta L$). The optical path length difference can be adjusted by the interval between the mirror 14 and the polarizing beam splitter 9.

Accordingly, the optical path length of the luminous flux 1 until it is superimposed with the luminous flux 2 by the splitting plane of the polarizing beam splitter 9 after being split by the splitting plane of the polarizing beam splitter 3 becomes equal to the optical path length of the luminous flux 2 until it is superimposed with the luminous flux 1 by the splitting plane of the polarizing beam splitter 9 after being split by the splitting plane of the polarizing beam splitter 3 ($2\times L_1+2\times L_2+2\times L_3+L_8+L_9=L_4+2\times L_5+2\times L_6+2\times L_7+L_{10}$).

It can be seen from the above explanation that the optical path lengths of the luminous flux 1 and the luminous flux 2 superimposed in the splitting plane of the polarizing beam splitter 9 become equal to each other.

The superimposed luminous flux 1 and luminous flux 2 pass through a lens 21, and are focused so as to have an appropriate size on photodiodes 33, 34, 35 and 36.

After passing through the lens 21, the luminous flux 1 and the luminous flux 2 pass through a quarter-wave plate 22 whose optical axis is tilted by 45° with respect to the polarization direction, to be converted to circularly-polarized light beams whose polarization planes rotate in mutually opposite directions.

Moreover, since the luminous flux 1 and the luminous flux 2 have been diffracted twice by the diffraction grating 4, the phases thereof vary by $+2Kx$, $-2Kx$, respectively, when the diffraction grating 4 moves in the X direction ($K=2\pi/\Lambda$: lattice constant).

The light obtained by superimposing two circularly-polarized light beams rotating in mutually opposite directions can be regarded as a linearly-polarized light beam which rotates in accordance with a phase difference between the two light beams. Therefore, the superimposed luminous flux after passing through the quarter-wave plate 22 can be regarded as a linearly-polarized light beam whose polarization plane rotates by $2Kx$ (radian) when the diffraction grating moves by x.

The superimposed luminous flux is split into two by a non-polarizing beam splitter 23, and one of them travels toward a polarizing beam splitter 24 and another travels toward a polarizing beam splitter 25.

The luminous flux is split into an S polarization component and a P polarization component by the polarizing beam splitter 24, and the S polarization component is received by the photodiode 33 and the P polarization component is received by the photodiode 34.

When the light quantities received by the photodiode 33 and the photodiode 34 are respectively denoted by $I_{33}$ and $I_{34}$, these are expressed as follows.

$$I_{33} = \frac{1}{4}a^2\{1 + \mathrm{SIN}(4Kx+\delta)\}$$

$$I_{34} = \frac{1}{4}a^2\{1 - \mathrm{SIN}(4Kx+\delta)\}$$

[Formula 3]

Where $\delta$ is the initial phase.

When the diffraction grating 4 moves in the X direction, an interference signal that sinusoidally fluctuates is obtained. A current signal proportional to the signal is output from the photodiode. It can be seen that the signals obtained from the photodiode 33 and the photodiode 34 serve as inversion signals whose phases differ from each other by 180°.

Another luminous flux split by the non-polarizing beam splitter 23 enters the polarizing beam splitter 25 that is rotated by 45° about the optical axis. The luminous flux is split into an S polarization component and a P polarization component by the polarizing beam splitter 25, and the S polarization component is received by the photodiode 35 and the P polarization component is received by the photodiode 36.

When the light quantities received by the photodiode 35 and the photodiode 36 are respectively denoted by $I_{35}$ and $I_{36}$, these are expressed as follows.

$$I_{35} = \frac{1}{4}a^2\{1 + \mathrm{SIN}(4Kx - 90° + \delta)\} = \frac{1}{4}a^2\{1 - \mathrm{COS}(4Kx+\delta)\}$$

$$I_{36} = \frac{1}{4}a^2\{1 - \mathrm{SIN}(4Kx - 90° + \delta)\} = \frac{1}{4}a^2\{1 + \mathrm{COS}(4Kx+\delta)\}$$

[Formula 4]

$I_{33}$ and $I_{34}$ are a pair of Sin $\theta$ components, whereas $I_{33}$ and $I_{36}$ are a pair of Cos $\theta$ components whose phase shifts by 90°. $I_{33}$ and $I_{34}$ are mutually inverted signals and $I_{33}$ and $I_{36}$ are mutually inverted signals, so the fluctuation of the DC component of the signal can be canceled by subtraction. Moreover, since a pair of signals of Sin $\theta$ and Cos $\theta$ whose phases shift from each other by 90° are formed by subtraction, it becomes possible to discriminate, by the use of a generally well-known method, which side, left or right, in the X direction the diffraction grating 4 is moving to.

Although these signals vary for one cycle when the diffraction grating 4 moves by Λ/4 in the X direction, it becomes possible to accurately detect a displacement amount smaller than Λ/4 by calculating θ=A tan θ from Sin and Cos θ signals.

The signals from the photodiodes 33, 34, 35, and 36 are sent to a relative-position detector 10. Next, the operation of the relative-position detector 10 will be explained by the use of FIG. 3.

The relative-position detector 10 performs current-voltage conversion of the signals from the photodiodes 33, 34, 35, and 36. When voltage signals after the current-voltage conversion are respectively denoted by $V_{33}$, $V_{34}$, $V_{35}$, and $V_{36}$, a first differential amplifier 61a generates a signal of $(V_{33}-V_{34})\times\alpha$, and a second differential-amplifier 61b generates a signal of $(V_{36}-V_{35})\times\beta$. The multiplication factors α and β are set so that the amplitudes of two signals after amplification become equal to each other and also so as to match the input allowable ranges of A/D converters in the subsequent stage.

The two differentially amplified signals are digitized from the analog Sin signal and Cos signal to digital signals by A/D converters 62a and 62b, and are subjected to arithmetic processing in a waveform correction processing section 63. In the waveform correction processing section 63 and an incremental signal generator 64, the arithmetic processing is performed by a DSP-incorporated programmable logic device or the like to correct an amplitude fluctuation, offset fluctuation, and phase fluctuation of the Sin θ signal and the Cos θ signal due to disturbances in the analog signals. It is possible to generate a more accurate scale of positional information and generate an incremental signal in a required format, by obtaining θ=A tan θ from the corrected signal. Furthermore, it is also possible to generate the incremental signal after removing, by arithmetic processing, an error caused by a fluctuation of the grating cycle of the diffraction grating and obtained in advance.

A specific configuration example of the method for correcting waveforms is described in Japanese Laid-Open Patent Publication No. 06-167354, and a specific configuration example of the method for generating the incremental signal is described in Japanese Laid-Open Patent Publication No. 08-201110.

Next, an effect of the lens 7 that corrects the optical paths of the luminous flux 1 and the luminous flux 2 and an effect of diffracted light beam being emitted perpendicularly to the grating plane will be explained by the use of FIG. 5 to FIG. 10.

In the case where the lens 7 does not exist, once the diffraction grating 4 is tilted, then the optical paths of the luminous flux 1 and the luminous flux 2 change and the overlapping of the two luminous fluxes shifts, and thus the difference (hereinafter, referred to as an amplitude) between the maximum value and minimum value of an interference signal decreases. A decrease in the amplitude of an interference signal leads to a decrease in the S/N ratio of a voltage signal used in the relative-position detector 10. Furthermore, since the optical path length difference between the two luminous fluxes changes by the change of the optical path, a change of the interference signal due to the change of the optical path length difference is also generated. Since the change cannot be distinguished from a change when the diffraction grating 4 is displaced in the X-axis direction, the change appears as an error in measuring a displacement in the X-axis direction.

Figure 5:
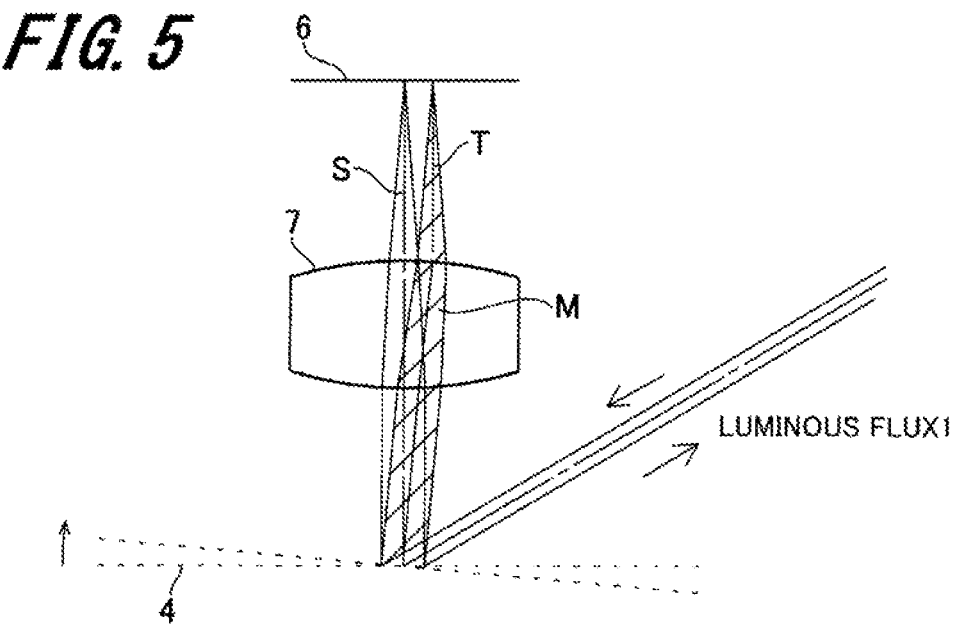
FIG. 5 is an explanatory view illustrating an action of a correcting lens in the displacement detection apparatus according to the first exemplary embodiment of the present invention, and is an explanatory view illustrating a state in which the diffraction grating is tilted.
Figure 6:
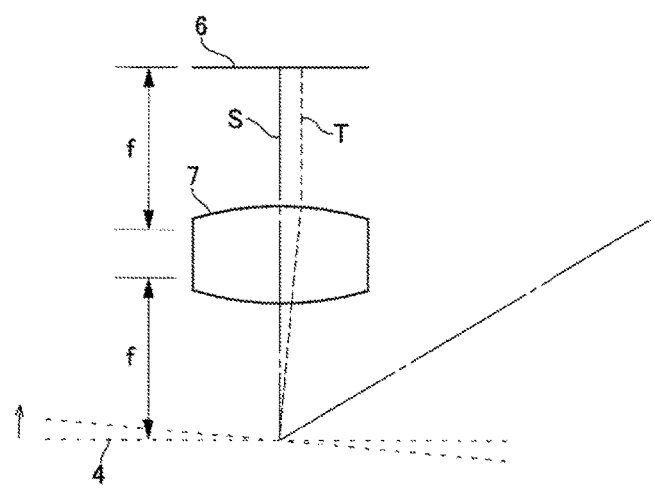
FIG. 6 is an explanatory view illustrating an action of the correcting lens in the displacement detection apparatus according to the first exemplary embodiment of the present invention, and is an explanatory view illustrating a state in which the diffraction grating is tilted.

In the example 1, the lens 7 is arranged so that one focus position is located on the grating plane of the diffraction grating 4 and another focus position is located on the reflective plane of the mirror 6, as illustrated in FIG. 6. Accordingly, even when the diffraction grating 4 is tilted, there is not generated a large deviation between the luminous flux 1 and the luminous flux 2 which are superimposed by the polarizing beam splitter 9, as described also in Japanese Laid-Open Patent Publication No. 2012-2787, and thus there exists an effect of significantly suppressing a reduction in the amplitude of an interference signal. The above point will be explained by the use of FIG. 5 and FIG. 6.

When the diffraction grating 4 is tilted, the diffracted light beam tilts like light beams indicated by oblique lines as in FIG. 5. A one-dot chain line of FIG. 6 represents the optical axis of a luminous flux when the diffraction grating 4 is not tilted, and a dotted line represents the optical axis of a luminous flux when the diffraction grating 4 is tilted. Since one focal point of the lens 7 is on the diffraction grating 4, even when the diffraction grating 4 is tilted, the optical axis of the diffracted light beam after passing through the lens 7 becomes always perpendicular to the mirror 6 and there is not generated a deviation in the optical path before and after being reflected by the mirror 6. Furthermore, it can be seen that, since the optical path lengths of the one-dot chain line and dotted line are always equal to each other due to the action of the lens, a change in the optical path length due to the tilt of the diffraction grating 4 does not also occur.

Moreover, it can be seen from FIG. 5 that, since another focal point of the lens 7 is on the reflective plane of the mirror 6, the parallel luminous fluxes having passed through the lens 7 are focused onto one point on the reflective plane of the mirror 6 and the shape of the luminous flux does vary before and after being reflected by the mirror 6.

Only the example of the luminous flux 1 has been described in the foregoing. However, it can be seen that, since the luminous flux 2 is symmetric to the luminous flux 1 with respect to the central axis of the lens 7, the above explanation can be similarly applicable and the luminous flux 2 also causes neither a deviation of the optical path and nor a change in the optical path length caused by the tilt of the diffraction grating 4. It can be seen that, since both the luminous flux 1 and the luminous flux 2 cause neither a deviation of the optical path nor a change in the optical path length due to tilt of the diffraction grating 4, the interference signal in the light-receiving section 8 does not vary even when the diffraction grating 4 is tilted, and thus an error is not generated.

Furthermore, the following effects are generated since the central axis of the lens 7 is perpendicular to the grating plane of the diffraction grating 4 and the direction of the diffraction is perpendicular to the grating plane.

Figure 7A:
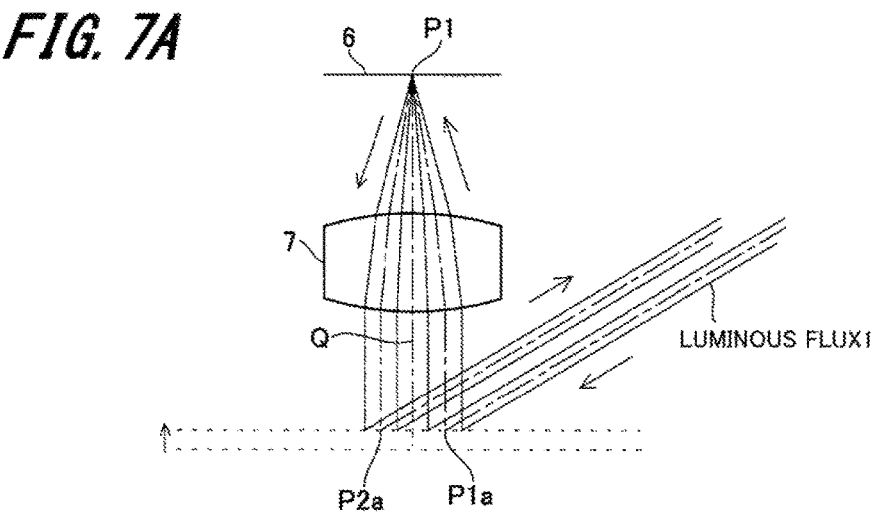
FIGS. 7A and 7B are an explanatory view illustrating an action of the correcting lens in the displacement detection apparatus according to the first exemplary embodiment of the present invention, and an explanatory view illustrating a state in which the diffraction grating moves in a height direction.
Figure 7B:
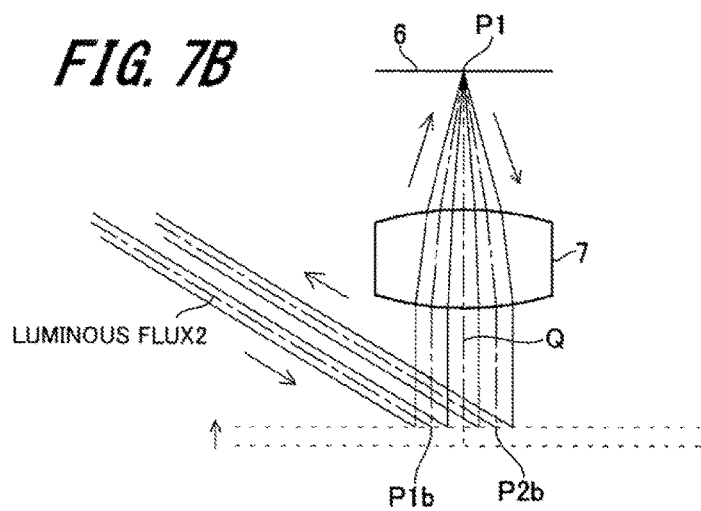
Figure 12:
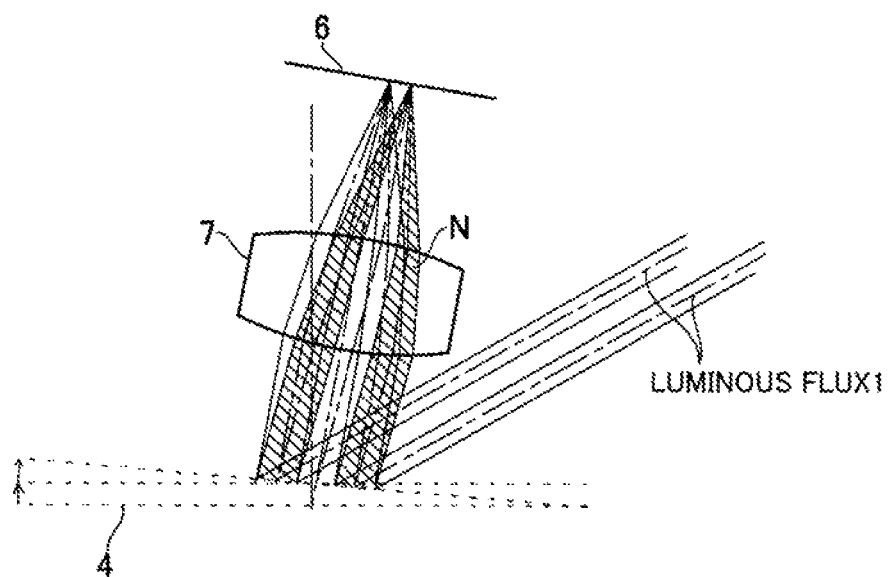
FIG. 12 is an explanatory view illustrating an optical system in which the optical axis of the correcting lens is tilted with respect to the measuring plane of the diffraction grating, and is an explanatory view illustrating a state in which the diffraction grating moves and is tilted in the height direction.
Figure 13:
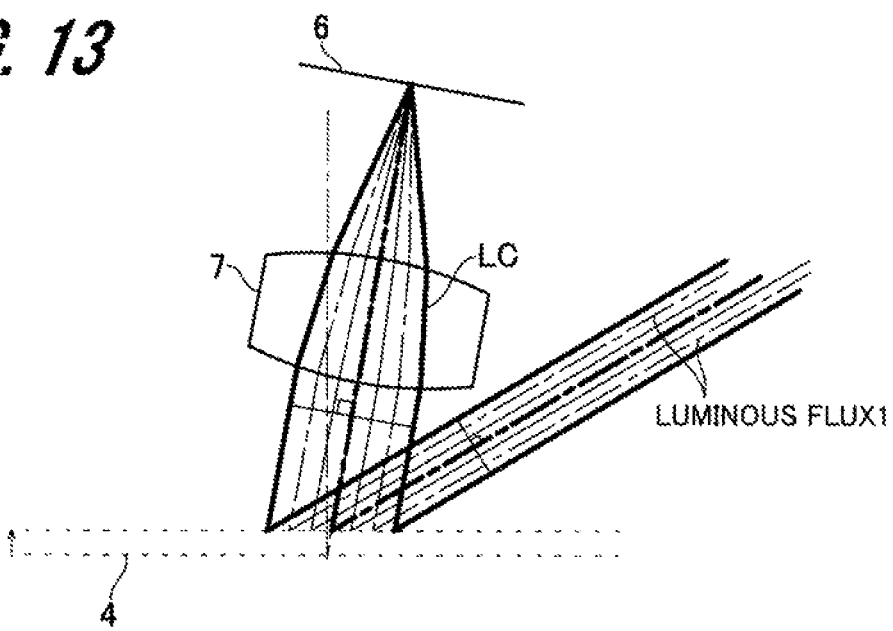
FIG. 13 is an explanatory view illustrating the optical system in which the optical axis of the correcting lens is tilted with respect to the measuring plane of the diffraction grating.
Figure 14:
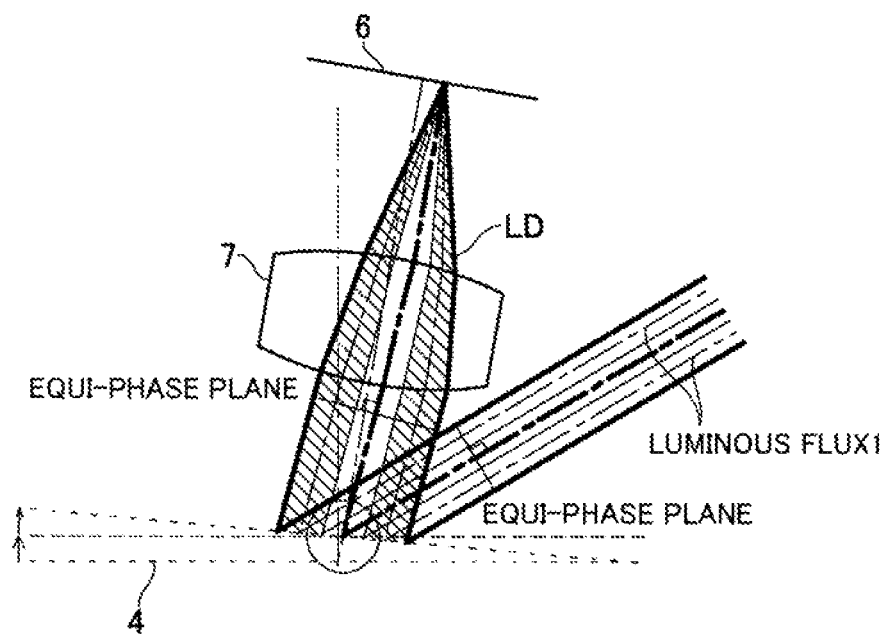
FIG. 14 is an explanatory view illustrating the optical system in which the optical axis of the correcting lens is tilted with respect to the measuring plane of the diffraction grating.

When the diffraction grating 4 moves in the vertical direction, both the first-time incident point and second-time incident point to the diffraction grating 4 move to a position deviated from the central axis of the lens 7 as illustrated in FIGS. 7A and 7B (in the view, the luminous flux 1 and the luminous flux 2 are separately illustrated for the explanation). When the incident point to the diffraction grating 4 is deviated, the phase of diffracted light beam changes by −4 KΔx corresponding to a deviation amount Δx. However, since the lens 7, the diffraction grating 4, and the mirror 6 are arranged so that one focus position of the lens 7 is located on the grating plane of the diffraction grating 4 and another focus position is located on the reflective plane of the mirror 6, the lateral magnification is 1 when grating plane=>lens 7=>mirror 6=>grating plane is regarded as one optical system. Therefore, as illustrated in FIG. 12, the incident point moves, by the same distance, horizontally symmetrically with respect to the central axis of the lens 7, on the return optical path. Accordingly, phase deviations on the forward optical path and the return optical path are mutually cancelled, resulting in no change in the phase of the luminous flux. Furthermore, the movement in the vertical direction of the diffraction grating 4 increases or reduces the optical path length. However, as apparent from FIGS. 7A and 7B, since the optical path lengths of the luminous flux 1 and the luminous flux 2 change by the same amount, the interference signal in the light-receiving section 8 does not change, and thus it can be seen that an error is not generated.

Figure 8:
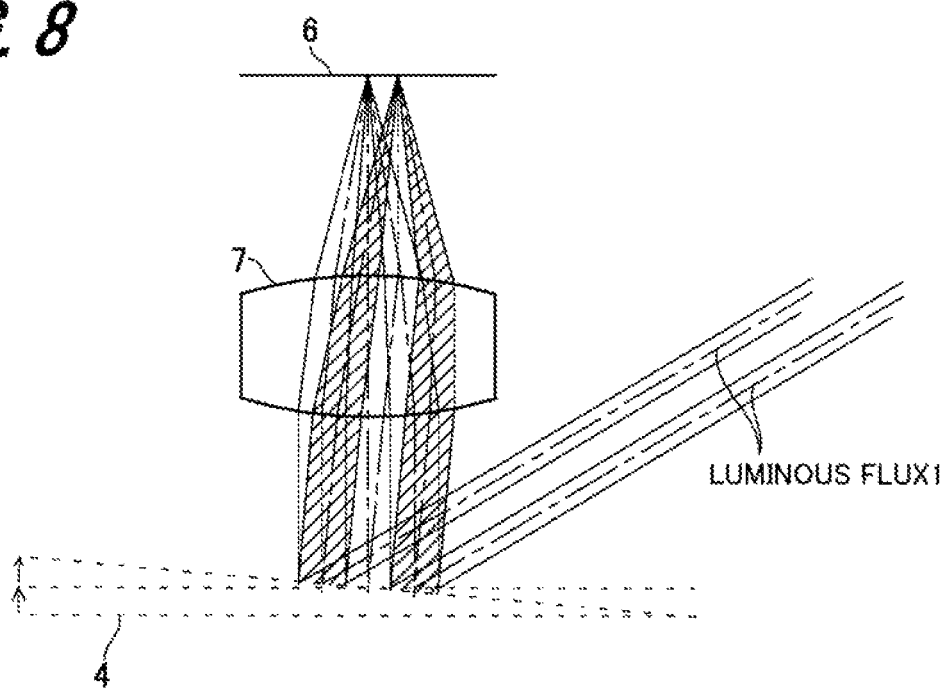
FIG. 8 is an explanatory view illustrating an action of the correcting lens in the displacement detection apparatus according to the first exemplary embodiment of the present invention, and is an explanatory view illustrating a state in which the diffraction grating moves and is tilted in the height direction.

When the diffraction grating 4 moves in the vertical direction and is further tilted, the optical path changes like a hatched portion of FIG. 8. When the luminous flux of FIG. 6 is considered as a forward light beam and a return light beam all together as in FIG. 9, the parallel beams having the optical axis of a thick one-dot chain line can be considered to be the same as being focused on the reflective plane of the mirror 6 if the movement in the vertical direction of the diffraction grating 4 substantially falls within a range of focus depth of the lens 7. Therefore, it can be seen that the optical path lengths of light beams are substantially equal to one another within a range of thick dotted lines, due to the action of the lens.

Figure 9:
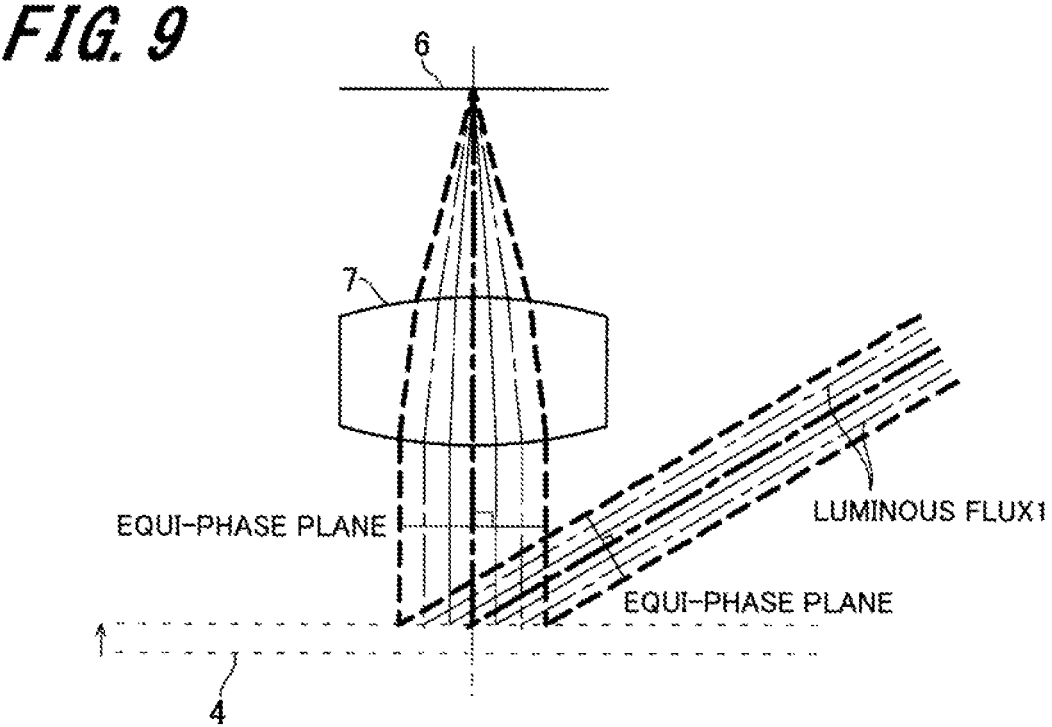
FIG. 9 is an explanatory view illustrating an action of the correcting lens in the displacement detection apparatus according to the first exemplary embodiment of the present invention.
Figure 10:
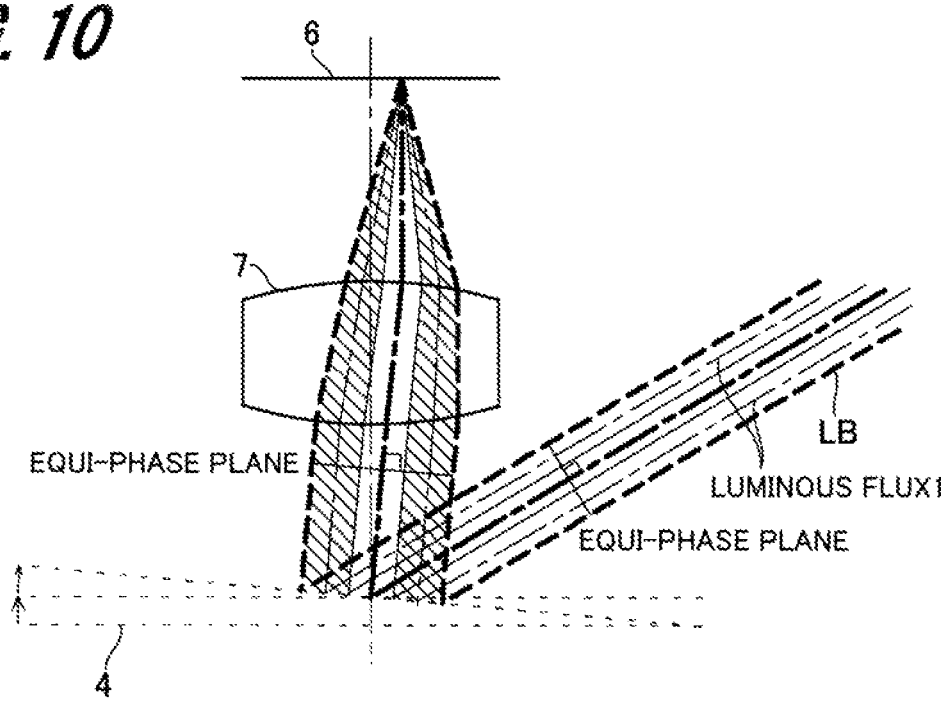
FIG. 10 is an explanatory view illustrating an action of the correcting lens in the displacement detection apparatus according to the first exemplary embodiment of the present invention.

FIG. 10 illustrates a state where the diffraction grating 4 is tilted from the state. As with FIG. 9 also in the case, a forward luminous flux and a return luminous flux can be considered all together as one luminous flux having a thick one-dot chain line as the optical axis. As compared with FIG. 6, in a range in which the thick one-dot chain line representing the optical axis of FIG. 10 is kept to be perpendicular to the reflective plane of the mirror 6 after passing through the lens 7 as with the dotted line of FIG. 6, the explanation in FIG. 5 and FIG. 6 can be similarly applicable.

However, in the case of FIG. 10, an error does not become 0 since the position of the grating plane of the diffraction grating 4 deviates from the focus position of the lens 7, but it can be seen that the optical path length of the light beam within the thick dashed lines of FIG. 9 becomes substantially equal to the optical path length of the light beam within the thick dashed lines of FIG. 10. Therefore, an optical path length of a luminous flux before the diffraction grating 4 of FIG. 10 is tilted can be said to be substantially equal to an optical path length, indicated by a hatched portion, of the luminous flux after the diffraction grating 4 is tilted. Accordingly, a change of the interference signal in the light-receiving section 8 becomes extremely small, and the error when the diffraction grating 4 moves in the vertical direction and is tilted can be significantly reduced as compared with the case of not employing the configuration explained above.

The effect described above is produced when there are satisfied the two facts that: the central axis of the lens 7 is perpendicular to the grating plane of the diffraction grating 4; and the direction of diffraction is perpendicular to the grating plane. The direction of diffraction is not necessarily required to be perfectly perpendicular to the grating plane, but as the diffraction direction is further away from the perpendicular, the influence of non-axial aberration of the lens 7 increases. Therefore, it is desirable that the diffraction direction is preferably closer to the perpendicular in order to reduce the generation of an error.

Hereinafter, there will be explained by the use of FIG. 11 to FIG. 17 the reason why a large error is generated when the diffraction grating 4 moves in the vertical directions and is tilted, in the case where the central axis of the lens 7 and the direction of the diffracted light beam are not perpendicular but tilted with respect to the grating plane.

Figure 11:
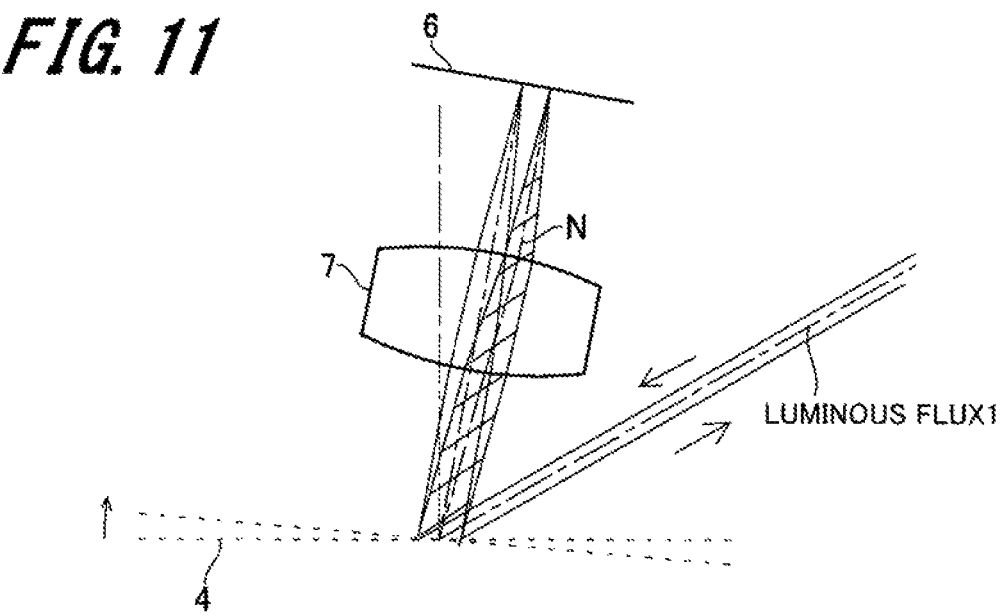
FIG. 11 is an explanatory view illustrating an optical system in which the optical axis of the correcting lens is tilted with respect to the measuring plane of the diffraction grating, and is an explanatory view illustrating a state in which the diffraction grating is tilted.

FIG. 11 illustrates a case where the first-time diffracted light beam is emitted in a tilted direction, not in the direction perpendicular to the grating plane. Since the central axis of the lens 7 is aligned with the optical axis of the diffracted light beam, the central axis is not perpendicular but is tilted with respect to the grating plane of the diffraction grating. In the case, since the optical path after diffraction in the diffraction grating 4 differs between the luminous flux 1 and the luminous flux 2, the lens 7 is required for each of the luminous flux 1 and the luminous flux 2.

The hatched portion illustrated in the view is the optical path when the diffraction grating 4 is tilted. One focus position of the lens 7 is aligned with the grating plane of the diffraction grating 4, and another focus position is aligned with the reflective plane of the mirror 6. Also in the case, even when the diffraction grating 4 is tilted, a change in the optical path length or a deviation of the optical path of the second-time diffracted light beam is not generated. This is because the reason similar to that explained in FIG. 5 and FIG. 6 is applied.

Also when the diffraction grating 4 moves in the vertical direction, the explanation in FIGS. 7A and 7B can be substantially applicable as is, the phase change due to the movement of the incident point is canceled, and the optical path length of the luminous flux 1 and the optical path length of the luminous flux 2 change by the same amount. Therefore, the interference signal in the light-receiving section 8 does not vary.

When the diffraction grating 4 is moved in the vertical direction and is further tilted, the optical path changes like a hatched portion of FIG. 12. When the forward luminous flux and the return luminous flux are considered all together as in FIG. 13, as explained in FIG. 9, if the movement in the vertical direction of the diffraction grating 4 substantially falls within a range of a focus depth of the lens 7, the optical path lengths of light beams within the thick dotted lines can be considered as substantially equal. When a state where the diffraction grating 4 is tilted from the state is similarly considered, the optical path lengths of light beams within the thick line of FIG. 14 can be considered as substantially equal, as explained in FIG. 10.

Figure 15:
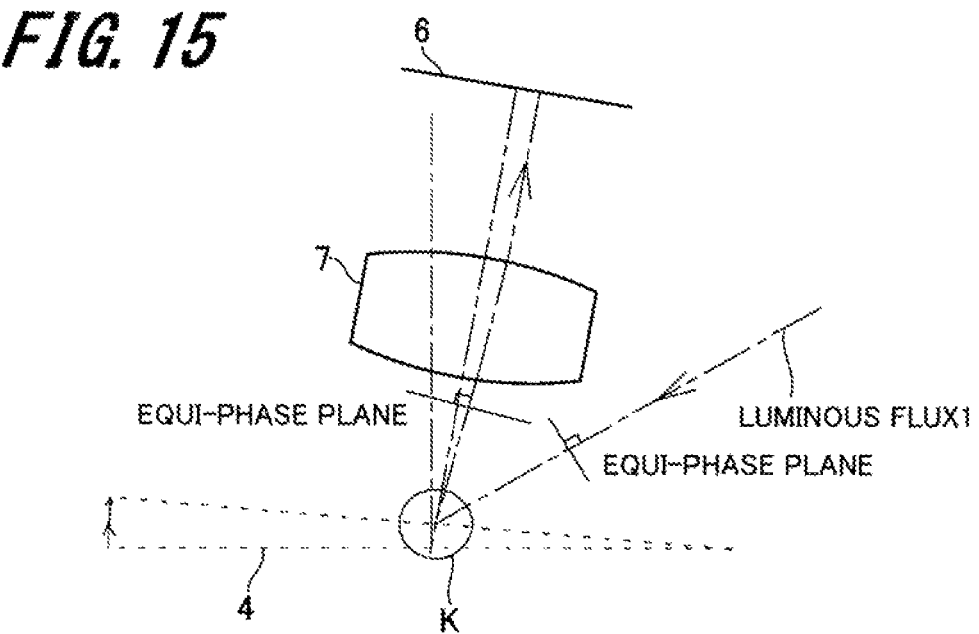
FIG. 15 is an explanatory view illustrating the optical system in which the optical axis of the correcting lens is tilted with respect to the measuring plane of the diffraction grating.
Figure 16:
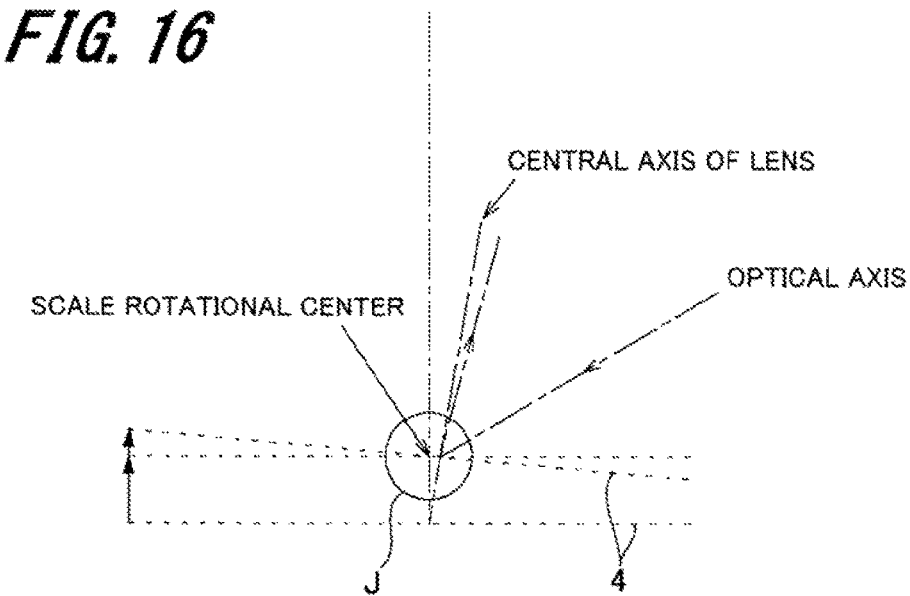
FIG. 16 is an explanatory view illustrating a main portion of FIG. 15, in an enlarged manner.
Figure 17:
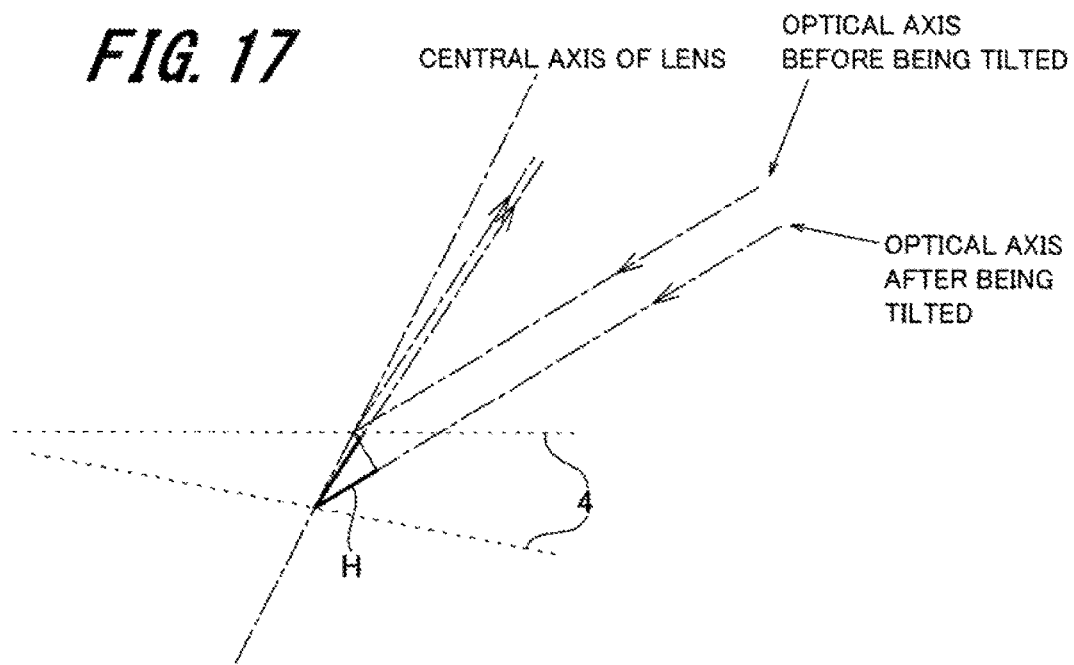
FIG. 17 is an explanatory view illustrating a main portion of FIG. 16, in an enlarged manner.

However, the optical path length of the light beam differs from the optical path length before the diffraction grating 4 is tilted. FIG. 15 illustrates only the virtual optical axis of a light beam obtained by putting together the light beams of FIG. 14, whereas FIG. 16 is an enlarged view of the portion enclosed by a circle of FIG. 15. It can be seen from FIG. 16 that a deviation is generated between the central axis of the lens 7 and the rotation center of the diffraction grating 4 by the movement of the diffraction grating 4 in the vertical direction, and the optical path becomes longer by the amount corresponding to the thick-line portion of FIG. 17 which is the enlarged view of the circle portion of FIG. 16. Although these views illustrate the situation of the luminous flux 1, it is easily understood that the optical path of the luminous flux 2 becomes contrarily shorter. Therefore, it can be seen that, when the diffraction grating 4 moves in the vertical direction and is further tilted, a large difference is generated in the optical path length between the luminous flux 1 and the luminous flux 2, a large fluctuation is generated also in the interference signal in the light-receiving section 8, and a large error occurs.

If the central axis of the lens 7 is perpendicular to the grating plane of the diffraction grating 4, the rotation center of the diffraction grating 4 is always aligned with the central axis of the lens 7 even when the diffraction grating 4 moves in the vertical direction, and thus the error as described above does not occur.

Accordingly, it can be seen that, in order to minimize the error associated when the diffraction grating 4 moves in the vertical direction and is further tilted, the central axis of the lens 7 is required to be perpendicular to the grating plane of the diffraction grating 4 and the first-time diffracted light beam is required to be emitted in the direction perpendicular to the grating plane.

Figure 18:
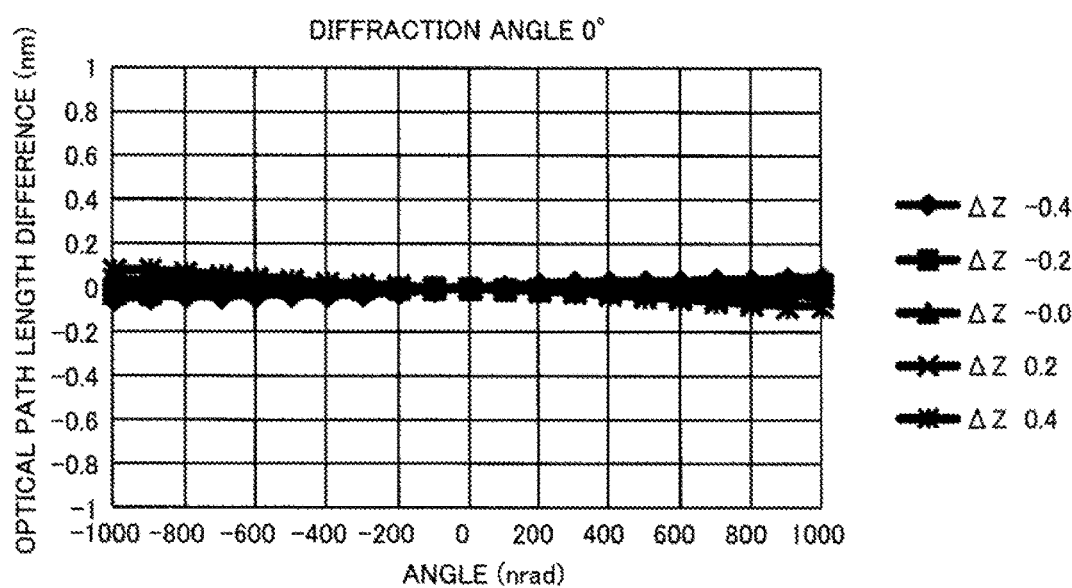
FIG. 18 is a graph illustrating an optical path length difference when the diffraction grating in the displacement detection apparatus according to the first exemplary embodiment of the present invention is tilted.
Figure 19:
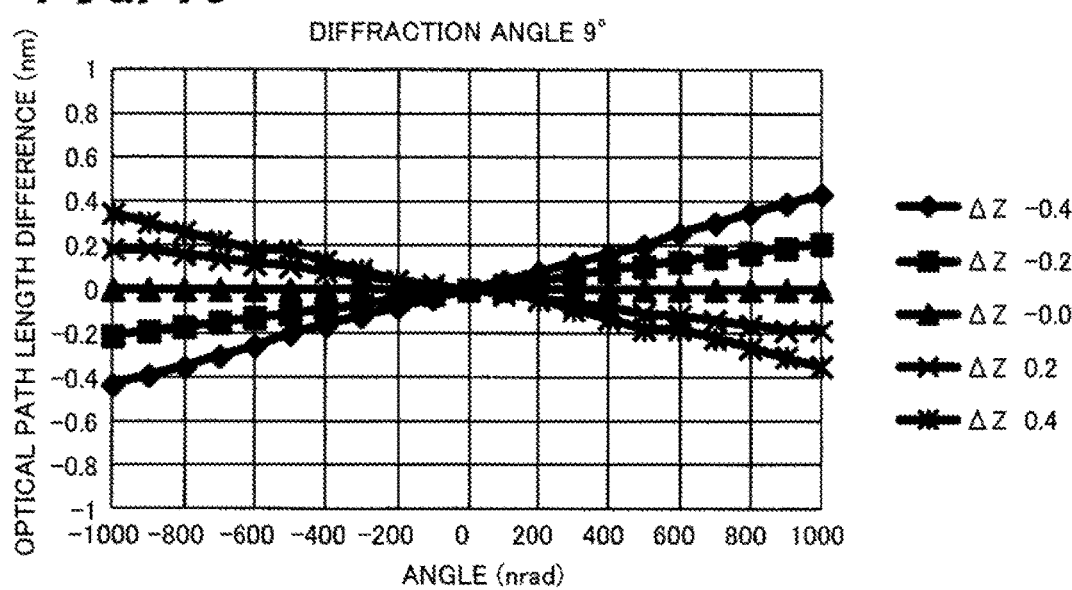
FIG. 19 is a graph illustrating the optical path length difference when the diffraction grating is tilted, and is a graph illustrating an example of the diffraction angle of 9°.
Figure 20A:
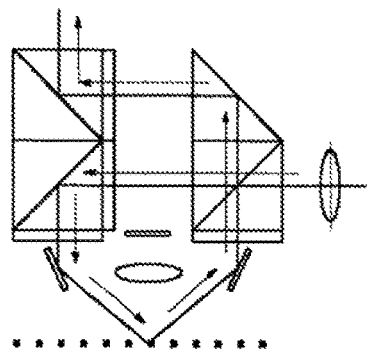
FIGS. 20A-20F are explanatory views illustrating the optical paths of the unnecessary light beam that reaches a light-receiving section in the displacement detection apparatus according to the first exemplary embodiment of the present invention.
Figure 20B:
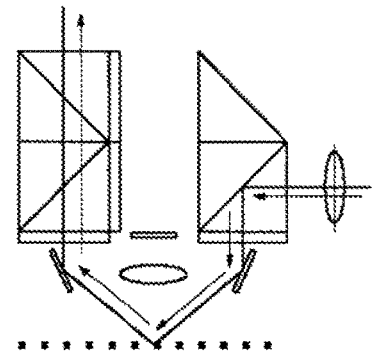
Figure 20C:
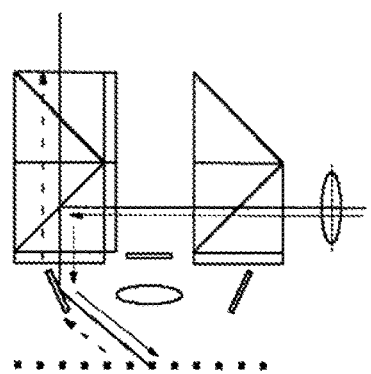
Figure 20D:
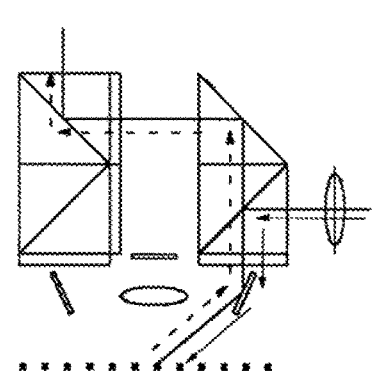
Figure 20E:
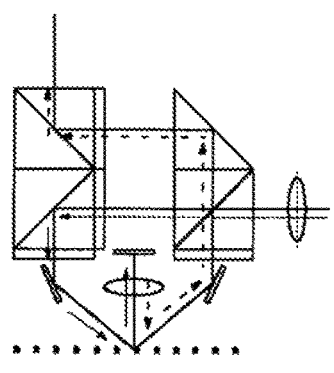
Figure 20F:
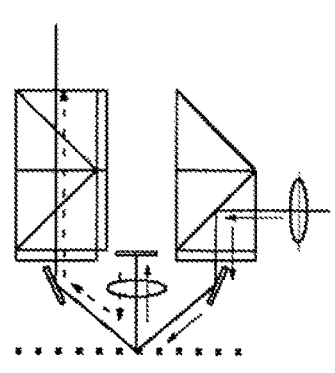

FIG. 18 and FIG. 19 illustrate the results of calculation by simulation of a difference in the optical path length between the luminous flux 1 and the luminous flux 2 in the case where the diffraction grating 4 is tilted when a lens having a focal length of 6.3 mm is used for the lens 7, the cycle of the diffraction grating 4 is set to 1 μm, and the wavelength of the light source 2 is set to 790 nm. The diffraction angle in the views is the angle between the normal of the diffraction grating 4 and the angle of the diffracted light beam. In the simulation, the central axis of the lens 7 is aligned with the optical axis of the diffracted light beam.

As can be seen from FIG. 18, in the case where the diffraction angle is 0° (diffraction is performed in a direction perpendicular to the grating plane), a slight optical path length difference is generated when the diffraction grating 4 is tilted due to an increase in ΔZ (movement in the vertical direction of the scale), but the generated optical path length difference is significantly smaller than in the case where the diffraction angle of FIG. 19 is 9°. It can be seen that the slight optical path length difference is quantitatively reduced down to approximately ⅛. Therefore, the effect of the central axis of the lens 7 being perpendicular to the diffracting plane of the diffraction grating 4 and the diffracted light beam being emitted in a direction perpendicular to the grating plane is apparent also from the simulation results.

Next, there will be explained: the effect of the polarizing beam splitter 3, the diffraction grating 4, and the diffraction grating 4 being arranged so that the optical path length $(L_4+L_5+L_6+L_7)$ of the luminous flux 2 from the splitting plane of the polarizing beam splitter 3 to the diffraction grating 4 becomes longer by ΔL than the optical path length $(L_1+L_2+L_3)$ from the splitting plane of the polarizing beam splitter 3 to the mirror 6; and the effect of the polarizing beam splitter 3, the polarizing beam splitter 9, and the polarizing beam splitter 16 being arranged so that the optical path length $(L_8+L_9)$ of the luminous flux 1 from the splitting plane of the polarizing beam splitter 3 to the polarizing beam splitter 9 becomes longer by ΔL than the optical path length $(L_{10})$ from the splitting plane of the polarizing beam splitter 16 of the luminous flux 2 to the splitting plane of the polarizing beam splitter 9.

As illustrated in FIGS. 20A-20F, the ±nth order diffracted light beam other than the luminous flux 1 and the luminous flux 2, which is the ±1st order diffracted light beam also reaches the light-receiving section 8. These light beams are essentially unnecessary, and when these unnecessary light beams interfere with each other or the unnecessary light beam interferes with the luminous flux 1 and the luminous flux 2, noise is generated in all cases, distorts the Sin and Cos signals obtained from the interference between the luminous flux 1 and the luminous flux 2, resulting in an error factor in obtaining positional information by interpolation of the Sin and Cos signals.

Accordingly, in the first exemplary embodiment, there is provided a difference between the optical path lengths of the unnecessary light beams and among the optical path lengths of the unnecessary light beam, the luminous flux 1, and the luminous flux 2, and the difference is set so as to be equal to or greater than the coherence length of the light source, thereby suppressing the interference between these light beams. The unnecessary light beam that simply reaches the light-receiving section without interference is removed by the differential amplifiers 61a and 61b explained earlier.

The optical path length difference between the respective diffracted light beams is given in Table 1.

TABLE 1

|  | −1st order +1st order | +1st order −1st order | −2nd order | +2nd order | +1st order +1st order | −1st order −1st order | 0th order(1) | 0th order(2) |
| --- | --- | --- | --- | --- | --- | --- | --- | --- |
| −1st order +1st order | — | 2ΔL | ΔL − 2nL$_3$ | ΔL − 2nL$_3$ | ΔL | ΔL | −2nL$_3$ | 2ΔL − 2nL$_3$ |
| +1st order −1st order | 2ΔL | — | −ΔL − 2nL$_3$ | −ΔL − 2nL$_3$ | −ΔL | −ΔL | −2ΔL − 2nL$_3$ | −2nL$_3$ |
| −2nd order | ΔL − 2nL$_3$ | −ΔL − 2nL$_3$ | — | 0 | 2nL$_3$ | 2nL$_3$ | −ΔL | ΔL |
| +2nd order | ΔL − 2nL$_3$ | −ΔL − 2nL$_3$ | 0 | — | 2nL$_3$ | 2nL$_3$ | −ΔL | ΔL |
| +1st order +1st order | ΔL | −ΔL | 2nL$_3$ | 2nL$_3$ | — | 0 | −ΔL − 2nL$_3$ | ΔL − 2nL$_3$ |
| −1st order −1st order | ΔL | −ΔL | 2nL$_3$ | 2nL$_3$ | 0 | — | −ΔL − 2nL$_3$ | ΔL − 2nL$_3$ |
| 0th order(1) | −2nL$_3$ | −2ΔL − 2nL$_3$ | −ΔL | −ΔL | −ΔL − 2nL$_3$ | ΔL − 2nL$_3$ | — | 2ΔL |
| 0th order(2) | 2ΔL − 2nL$_3$ | −2nL$_3$ | ΔL | ΔL | ΔL − 2nL$_3$ | −ΔL − 2nL$_3$ | 2ΔL | — |

In the item field in the table, "+1st order, −1st order" indicate that the first-time diffraction is the +1st order light beam and the second-time diffraction is the −1st order light beam. For example, 2ΔL in the box at which the column "+1st order, −1st order" and the row "−1st order, +1st order" crosses represents the optical path length difference between these two light beams. Where n is an integer, and corresponds to the fact that the 0-th order light beam is repeatedly reflected between the diffraction grating 4 and the lens 7.

It can be seen from the table that, if ΔL and L$_3$ satisfy all the following conditions, the optical path length difference between the respective diffracted light beams becomes equal to or greater than a coherence length Δl.

$\Delta L > \Delta l$ $2L_3 > \Delta l$ $|\Delta L - 2nL_3| > \Delta l$ $|2(\Delta L - nL_3)| > \Delta l$ [Formula 5]

Where n is the number of times of reflection required until the reflection light beam repeatedly travels back and forth between the diffraction grating 4 and the mirrors 6 sufficiently attenuates due to the corresponding diffracted light beam in the table. For example, the optical path length, of the luminous flux whose first-time diffraction and second-time diffraction are of the +1st order, from the splitting plane of the polarizing beam splitter 3 to the splitting plane of the polarizing beam splitter 9 is $2L_1+2L_2+2L_3+L_8+L_9$. However, when the luminous flux enters the diffraction grating the second time, simple reflection light beam (0-th order light beam) is also generated, the light beam then travels toward the mirror 6 and enters again the diffraction grating, and the same thing will be repeated hereinafter. Accordingly, if the number of times of reflection at the mirror 6 is denoted by n, in the case where the earlier optical path length becomes $2L_1+2L_2+2nL_3+L_8+L_9$. The n in the table represents the number of times of reflection. When an interference light intensity in the case of having interfered with another diffracted light beam at n=3 attenuates to the extent that it falls within an allowable range, $\Delta L$, $\Delta l$, and $L_3$ are set so as to satisfy the above formula with n=1, 2, and 3.

It can be seen from the above that, since the polarizing beam splitter 3, the polarizing beam splitter 9, and the polarizing beam splitter 16 are arranged so that the optical path length ($L_8+L_9$) of the luminous flux 1 from the splitting plane of the polarizing beam splitter 3 to the splitting plane of the polarizing beam splitter 9 becomes longer by $\Delta L$ than the optical path length ($L_{10}$) of the luminous flux 2 from the splitting plane of the polarizing beam splitter 16 to the splitting plane of the polarizing beam splitter 9, a difference equal to or greater than the coherence length of the light source 2 can be provided between the optical path lengths of the unnecessary light beams and also among the optical path lengths of the unnecessary light beam, the luminous flux 1, and the luminous flux 2; and at the same time, L3 is required to be set to a predetermined length.

In the above, as to the +2nd order light beam and the −2nd order light beam, the optical path lengths thereof become equal to each other and interference cannot be suppressed, but since the phase change of the interference light beam is $4K\Delta x$, which is in phase with the phase changes of the luminous flux 1 and luminous flux 2, the interference has small effect as the factor for signal distortion.

Figure 21:
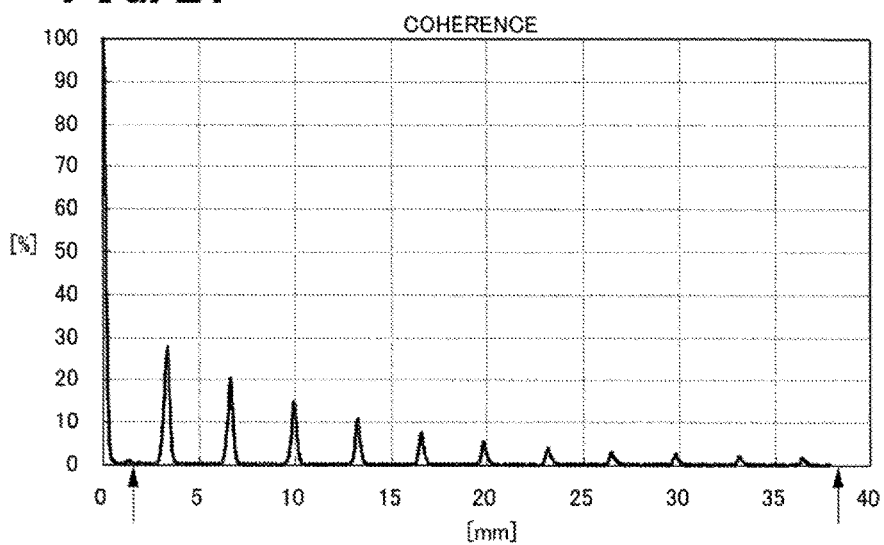
FIG. 21 is the visibility (interference intensity) curve indicative of a characteristic of a multimode semiconductor laser.

In the case of a light source having a plurality of oscillation frequency peaks, such as a multimode semiconductor laser, a plurality of peaks appears in the coherence curve as illustrated in FIG. 21. The vertical axis of the graph represents the visibility of interference light beam, and the horizontal axis represents the optical path length difference. In the case of such a light source, $\Delta L$, $2L_3$, $|\Delta L-2nL_3|$, and $|2(\Delta L-nL_3)|$ in Formula 5 are set so as to be located at a portion in the valley between the peaks, as indicated by the arrow in the view, or a large optical path length difference ($\Delta L >> 40$ mm) that does not allow a peak to appear needs to be employed.

As explained above, it is shown that the unnecessary interference can be suppressed by setting $\Delta L$ and $L_3$ to a specific magnitude, respectively.

Next, there will be described the effect of setting the optical path lengths of the luminous flux 1 and the luminous flux 2 superimposed in the splitting plane of the polarizing beam splitter 9, to be equal to each other.

In the first exemplary embodiment, the light source 2 having a relatively short coherence length is used, but when the optical path lengths of the luminous flux 1 and the luminous flux 2 are equal to each other, the luminous flux 1 and the luminous flux 2 interfere with each other at a peak of the visibility curve, resulting in an interference signal having a large amplitude.

Conversely, it is also possible to set the optical path lengths of the luminous flux 1 and luminous flux 2 to be equal to each other by adjusting the interval between the mirror 14 and the polarizing beam splitter 9 so that the amplitude of the interference signal of the luminous flux 1 and the luminous flux 2 becomes maximum.

It is possible to eliminate an error caused by the waveform fluctuation of a light source by setting the optical path lengths to be equal to each other. In the case of the first exemplary embodiment, when there is a difference $\Delta a$ between the optical path lengths after superimposing the luminous flux 1 and luminous flux 2 in the splitting plane of the polarizing beam splitter 9, an error $\Delta E$ occurs as described below if the wavelength of a light source varies by $\Delta \lambda$.

$$\Delta E = \frac{\Delta \lambda}{\lambda^2} \cdot \Delta a \cdot \frac{\Lambda}{4} \quad \text{[Formula 6]}$$

$\Delta \lambda$ is caused by a change in the temperature of the light source, the barometric pressure, and the humidity, and thus when $\Delta a$ is not 0, $\Delta E$ is caused by these fluctuations, resulting in an error in the measurement result. Conversely, when $\Delta a=0$ is established, stable measurement not being affected by these fluctuations can be performed.

2. Second Exemplary Embodiment of Displacement Detection Apparatus

Figure 22:
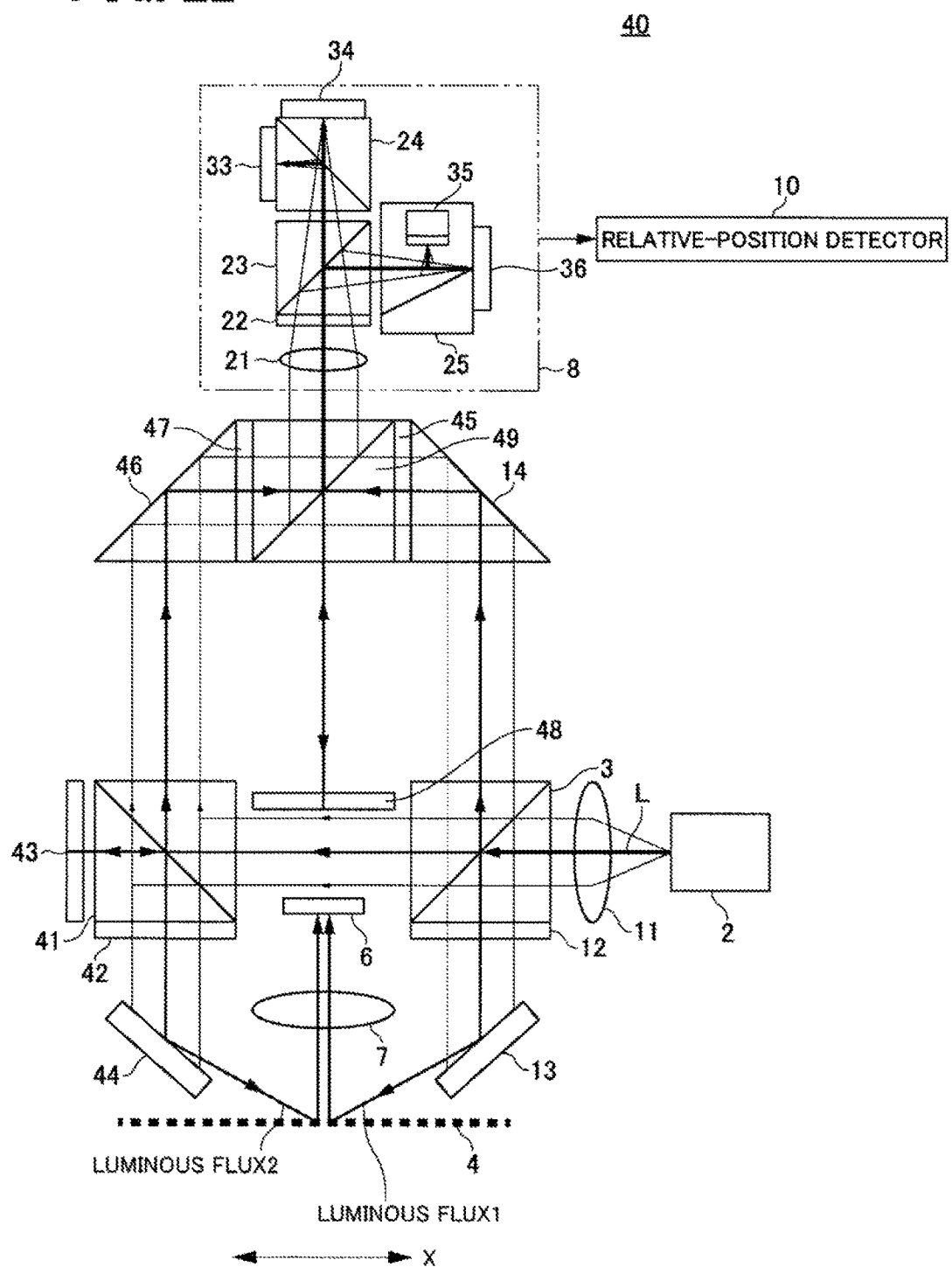
FIG. 22 is a schematic configuration diagram illustrating the configuration of a displacement detection apparatus according to a second exemplary embodiment of the present invention.
Figure 23:
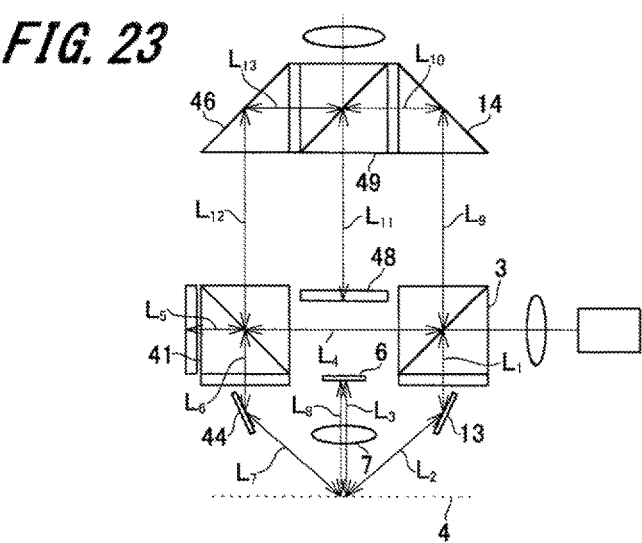
FIG. 23 is an explanatory view illustrating an optical path length from a luminous flux-splitting section to a light-receiving section in the displacement detection apparatus according to the second exemplary embodiment of the present invention.

A displacement detection apparatus 40 of the example is an apparatus for detecting the displacement in one direction of the diffraction grating. In the case of FIG. 22, the apparatus is for detecting the displacement in the X direction. Hereinafter, the example will be explained by the use of FIG. 22 and FIG. 23. In the following explanation, there will be omitted the explanation about a portion overlapping with the first exemplary embodiment.

The type/position of the light source and the optical path when the luminous flux emitted from the light source 2 is converted to a collimate beam by the lens 11, is then split by the luminous flux-splitting section including the polarizing beam splitter 3, one luminous flux 1 is diffracted by the diffraction grating 4, and again returns to the polarizing beam splitter 3, are similar to those of the first exemplary embodiment.

The returned luminous flux 1 passes through the polarizing beam splitter 3, is then reflected by the mirror 14, is converted from the P-polarized light beam to the S-polarized light beam by a half-wave plate 45, is further reflected by a polarizing beam splitter 49, and travels toward a quarter-wave plate 48. The rear surface of the quarter-wave plate 48 is a reflective plane, and the luminous flux 1 is reflected by the reflective plane and returns to the polarizing beam splitter 49. The luminous flux 1 passes through twice the quarter-wave plate 48 to be converted from the S-polarized light beam to the P-polarized light beam, passes through the luminous flux-coupling section including the polarizing beam splitter 49, and travels towards the light-receiving section 8.

Another luminous flux 2 split by the polarizing beam splitter 3 passes through a polarizing beam splitter 41 and travels toward a quarter-wave plate 43. The rear surface of the quarter-wave plate 43 is a reflective plane, and the luminous flux 2 is reflected by the reflective plane and returns to the polarizing beam splitter 41. The luminous flux 2 passes through twice the quarter-wave plate 43 to be converted from the P-polarized light beam to the S-polarized light beam, is then reflected by the polarizing beam splitter 41, and travels toward a mirror 44.

The optical path of the luminous flux 2 when the luminous flux 2 is reflected by the mirror 44, is diffracted by the diffraction grating 4, and then returns again to the polarizing beam splitter 41, is similar to that of first exemplary embodiment.

The returned luminous flux 2 passes through the polarizing beam splitter 41, is then reflected by a mirror 46, is converted from the P-polarized light beam to the S-polarized light beam by a half-wave plate 47, is then reflected by the polarizing beam splitter 49, is superimposed with the luminous flux 1, and travels toward the light-receiving section 8. The operations of the light-receiving section 8 and the relative-position detector 10 are similar to those of the first exemplary embodiment.

The polarizing beam splitter 3, the polarizing beam splitter 41, and the mirrors 13 and 44 are arranged so that an optical path length ($L_4+L_5\times2+L_6+L_7+L_8$) of the luminous flux 2 from the splitting plane of the polarizing beam splitter 3 to the mirror 6 becomes longer by $\Delta L$ than the optical path length ($L_1+L_2+L_3$) of the luminous flux 1 from the splitting plane of the polarizing beam splitter 3 to the mirror 6. Since the luminous flux 1 and the luminous flux 2 horizontally enter symmetrically with respect to the optical axis of the lens 7, $L_1=L_6$, $L_2=L_7$, and $L_3=L_8$ are established, and thus $L_4+L_5\times2=\Delta L$ is established.

The mirror 14, the mirror 46, the quarter-wave plate 48, and the polarizing beam splitter 49 are arranged so that an optical path length ($L_9+L_{10}+L_{11}\times2$) of the luminous flux 1 when the luminous flux 1 travels from the splitting plane of the polarizing beam splitter 3, is reflected by the rear surface of the quarter-wave plate 48, and returns to the splitting plane of the polarizing beam splitter 49, becomes longer by $\Delta L$ than an optical path length ($L_{12}+L_{13}$) of the luminous flux 2 from the splitting plane of the polarizing beam splitter 41 to the splitting plane of the polarizing beam splitter 49 ($L_9+L_{10}+L_{11}\times2=L_{12}+L_{13}+\Delta L$). The optical path length difference can be adjusted by the interval between the quarter-wave plate 48 and the polarizing beam splitter 49.

Although being omitted here, when the optical path length difference is obtained by following the optical path of unnecessary light beam similarly to the first exemplary embodiment, it can be seen that the conditions in which $\Delta L$ is satisfied is similar (Formula 9) to the first exemplary embodiment. Furthermore, since the optical path lengths of the luminous flux 1 and the luminous flux 2 after being superimposed in the splitting plane of the polarizing beam splitter 49 become equal to each other, the effect of the optical path lengths becoming equal to each other is similar to that of the first exemplary embodiment.

Moreover, the second exemplary embodiment has the following advantages as compared with the first exemplary embodiment. In the first exemplary embodiment, since the number of times of reflection differs in that the luminous flux 1 is reflected eight times and the luminous flux 2 is reflected seven times, the superimposed wave surface is horizontally reversed due to the effect of a mirror. Accordingly, when the wave faces of the luminous flux 1 and the luminous flux 2 are not horizontally symmetric, a deviation is generated in the superimposed wave surface, resulting in a decrease of the interference signal.

In contrast, in the second exemplary embodiment, since the numbers of times of reflection of the luminous flux 1 and luminous flux 2 are respectively nine, the shapes in the right and left directions of the superimposed wave surface become the same, and even when the wave surfaces of the luminous flux 1 and the luminous flux 2 are not horizontally symmetric, a deviation is not generated in the superimposed wave surface. Therefore, the interference signal does not decrease.

3. Third Exemplary Embodiment

Figure 24:
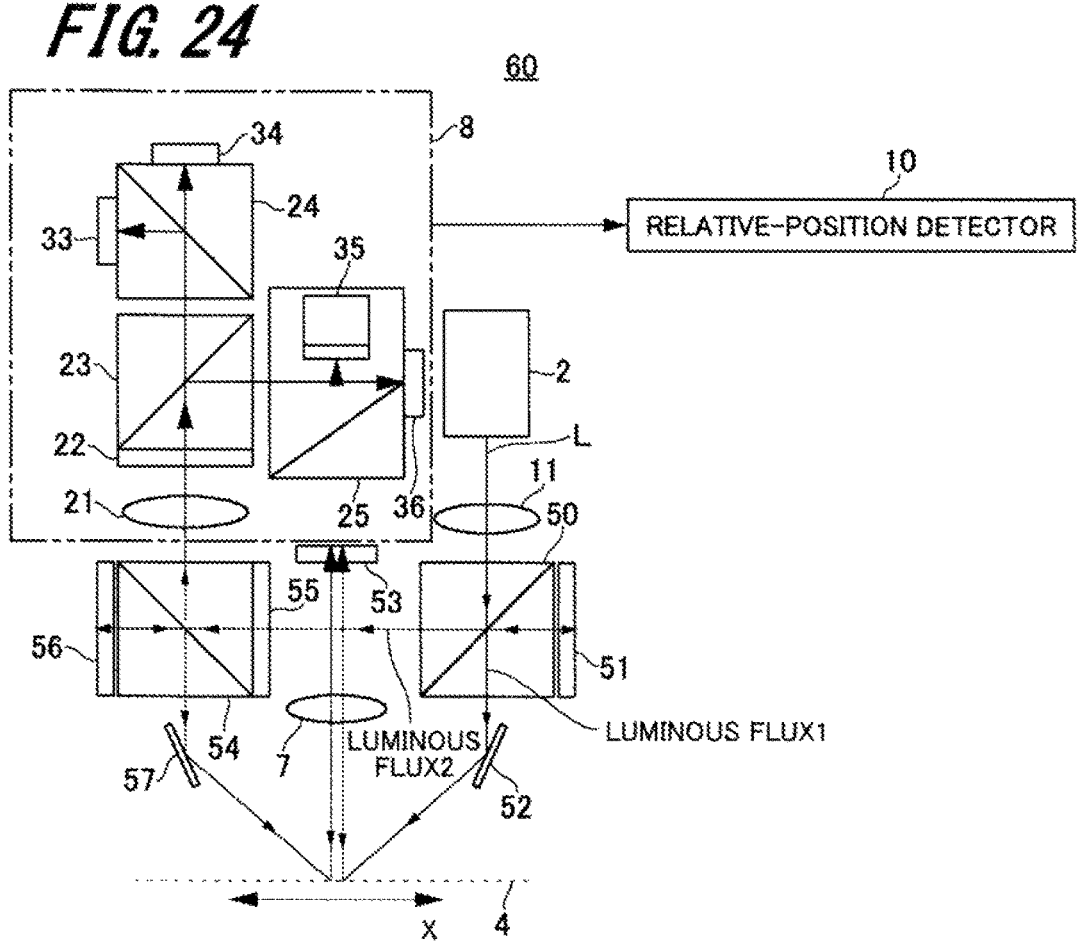
FIG. 24 is a schematic configuration diagram illustrating the configuration of a displacement detection apparatus according to a third exemplary embodiment of the present invention.
Figure 25:
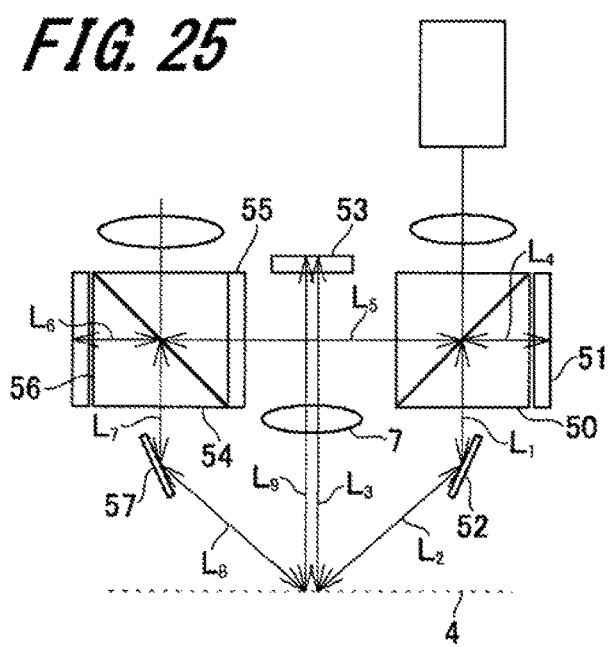
FIG. 25 is an explanatory view illustrating an optical path length from a luminous flux-splitting section to a light-receiving section in the displacement detection apparatus according to the third exemplary embodiment of the present invention.
Figure 26A:
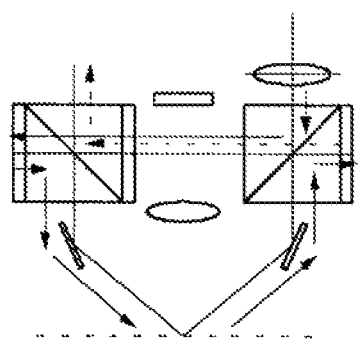
FIGS. 26A-26D are explanatory views illustrating the optical paths of the unnecessary light beam that reaches the light-receiving section in the displacement detection apparatus according to the third exemplary embodiment of the present invention.
Figure 26B:
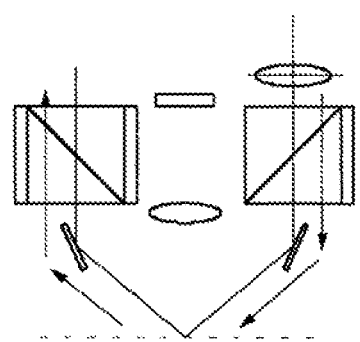
Figure 26C:
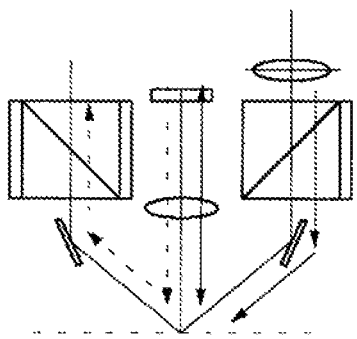
Figure 26D:
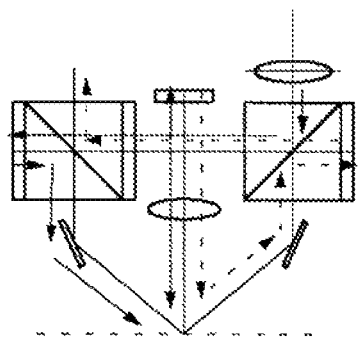

A displacement detection apparatus 60 of the example is an apparatus that detects a displacement in one direction of the diffraction grating, a displacement in the X direction in the case of FIG. 24. Hereinafter, the example will be explained by the use of FIG. 24, FIG. 25, and FIGS. 26A-26D.

A diverging light beam emitted from the light source 2 is converted to a collimate beam by the lens 11. The light beam converted to the collimate beam enters a luminous flux-splitting section including a polarizing beam splitter 50. The type/position of the light source 2 and the polarization direction of the light beam in entering the polarizing beam splitter 50 are similar to those of the first exemplary embodiment.

The luminous flux 1 transmitting through the polarizing beam splitter 50 is reflected by a mirror 52 and enters the diffraction grating 4. The condition of the incident angle is similar to that of the first exemplary embodiment. The luminous flux 1 diffracted by the diffraction grating 4 passes through the lens 7, and enters a diffracted light-reflecting section comprising a quarter-wave plate 53 having a reflective plane provided in the rear surface thereof. The arrangement of the lens 7 is similar to that of the first exemplary embodiment.

The luminous flux 1 reflected by the rear surface of the quarter-wave plate 53 is converted from the P-polarized light beam to the S-polarized light beam, and travels back through the optical path through which the luminous flux 1 originally traveled. The luminous flux 1 having returned to the polarizing beam splitter 50 is reflected to enter a quarter-wave plate 51 having a reflective plane provided in the rear surface thereof. The luminous flux 1 reflected by the quarter-wave plate 51 is converted from the S-polarized light beam to the P-polarized light beam, and enters a half-wave plate 55 through the polarizing beam splitter 50. The luminous flux 1 is converted from the P-polarized light beam to the S-polarized light beam by the half-wave plate 55, and is then reflected by the luminous flux-coupling section including a polarizing beam splitter 54 and travels toward the light-receiving section 8.

Another luminous flux 2 split by the polarizing beam splitter 50 enters the half-wave plate 55. The luminous flux 2 is converted from the S-polarized light beam to the P-polarized light beam by the half-wave plate 55, and passes through the polarizing beam splitter 54. The luminous flux 2 having passed through the polarizing beam splitter 54 enters a quarter-wave plate 56 having a reflective plane provided in the rear surface thereof. The luminous flux 2 reflected by the quarter-wave plate 56 is converted from the P-polarized light beam to the S-polarized light beam, is then reflected by the polarizing beam splitter 54 and further reflected by a mirror 57, and enters the diffraction grating 4.

The condition of the incident angle of the luminous flux 2 is similar to that of the first exemplary embodiment. The luminous flux 2 diffracted by the diffraction grating 4 passes through the lens 7, and is then reflected by the reflective plane of the quarter-wave plate 53 to be converted from the S-polarized light beam to the P-polarized light beam, and travels back through the original optical path. The luminous flux 2 having returned to the polarizing beam splitter 54 passes through the splitting plane of the polarizing beam splitter 54, and is then superimposed with the luminous flux 1 reflected by the splitting plane, and travels toward the light-receiving section 8. The operations of the light-receiving section 8 and the relative-position detector 10 are similar to those of the first exemplary embodiment.

The polarizing beam splitter 50, the polarizing beam splitter 54, and the mirrors 52 and 57 are arranged so that an optical path length ($L_5+L_6\times2+L_7+L_8+L_9$) of the luminous flux 2 from the splitting plane of the polarizing beam splitter 50 to the mirror 6 becomes longer by $\Delta L$ than the optical path length ($L_1+L_2+L_3$) of the luminous flux 1 from the splitting plane of the polarizing beam splitter 50 to the mirror 6. The optical path length is adjusted by moving the positions of the polarizing beam splitters 50 and 54, and the quarter-wave plate 56. Since the luminous flux 1 and the luminous flux 2 enter horizontally symmetrically with respect to the central axis of the lens 7, $L_1=L_7$, $L_2=L_8$, and $L_3=L_9$ are established, and thus $L_5+L_6\times2=\Delta L$ is established.

The polarizing beam splitter 50, the quarter-wave plate 51, and the polarizing beam splitter 54 are arranged so that an optical path length ($L_4\times2L_5$) of the luminous flux 1 when the luminous flux 1 travels from the splitting plane of the polarizing beam splitter 50, is reflected by the rear surface of the quarter-wave plate 51, and reaches the splitting plane of the polarizing beam splitter 54, becomes $\Delta L$. The optical path length is adjusted by moving the positions of the polarizing beam splitters 50 and 54, and the quarter-wave plate 51.

Accordingly, the optical path lengths of the luminous flux 1 and luminous flux 2 when both the luminous flux is split by the splitting plane of the polarizing beam splitter 50, is then diffracted by the diffraction grating 4, and reaches the splitting plane of the polarizing beam splitter 54, become equal to each other. ($(L_1+L_2+L_3+L_4)\times2+L_5=L_5+(L_6+L_7+L_8+L_9)\times2$).

In the third exemplary embodiment, light beams illustrated in FIGS. 26A-26D other than the luminous flux 1 and the luminous flux 2 reach the light-receiving section 8. Since the 2nd order light beam does not reach the light-receiving section and the light-receiving section 8 is not affected by an interference signal of the 2nd order light beams, unlike the first and second exemplary embodiments, the noise of the interference signal is more suppressed than those of the first and second exemplary embodiments.

Both the numbers of times of reflection of the luminous flux 1 and the luminous flux 2 until these fluxes reach the light-receiving section 8 are eight and the superimposed wave surface becomes the same as with the second exemplary embodiment, but a configuration with optical components fewer than in the second exemplary embodiment is possible.

The optical path length difference between the respective diffracted light beams is given in Table 2.

Interferences other than the interference between the luminous flux 1 and the luminous flux 2 can be suppressed by setting of $L_3$ and $\Delta L$ as follows.

$4nL_3 > \Delta l$ $|\Delta L - 2nL_3| > \Delta l$ $|\Delta L - (4n+2)L_3| > \Delta l$ $|2\Delta L - 4nL_3| > \Delta l$ [Formula 7]

Where n is the number of times of reflection of the 0-th order light beam required until the corresponding diffracted light beam in the table sufficiently attenuates, and $\Delta l$ is the coherence length of the light source.

4. Fourth Exemplary Embodiment

Figure 27:
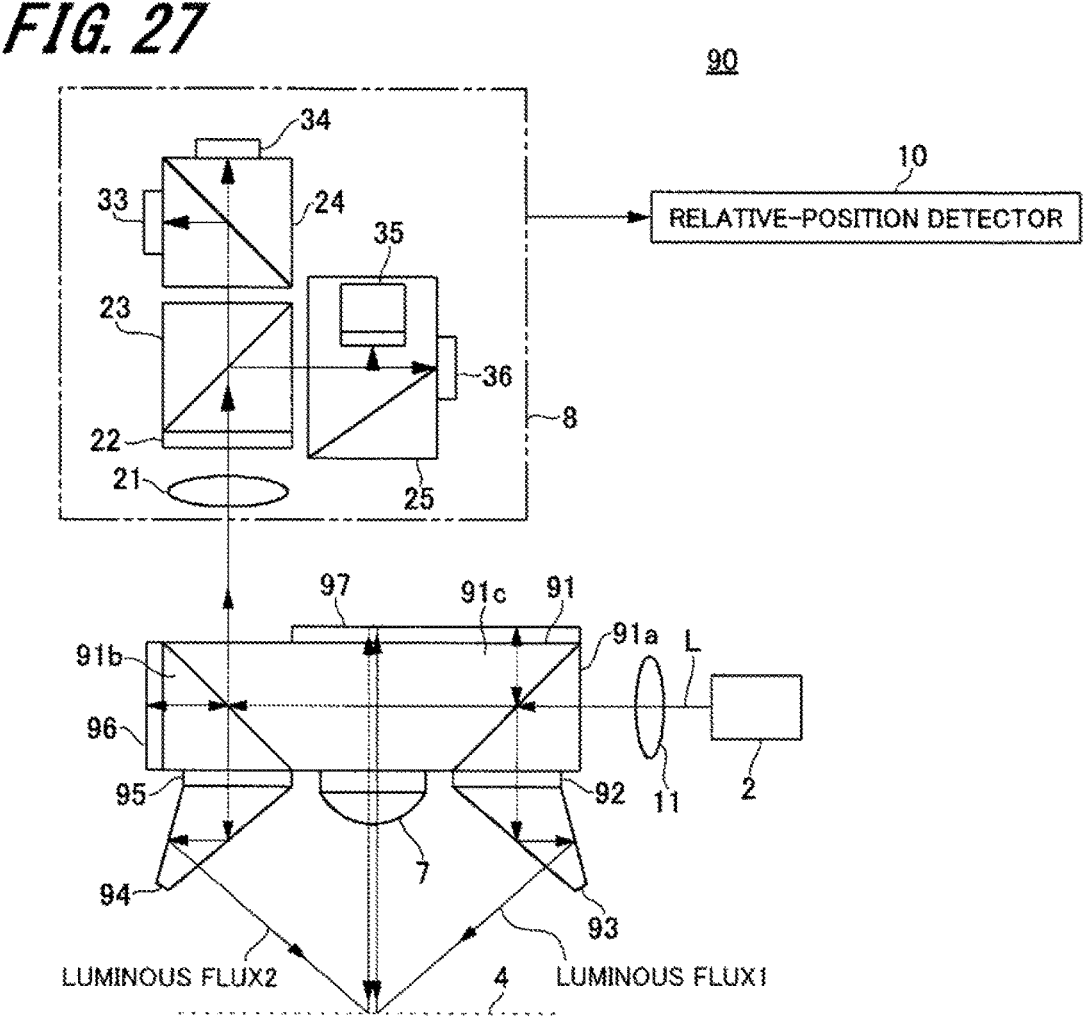
FIG. 27 is a schematic configuration diagram illustrating the configuration of a displacement detection apparatus according to a fourth exemplary embodiment of the present invention.
Figure 28:
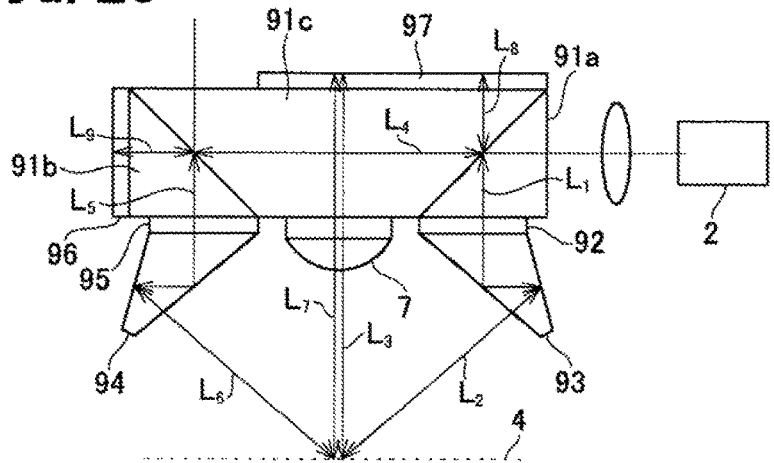
FIG. 28 is an explanatory view illustrating the optical path length from a luminous flux-splitting section to a light-receiving section in the displacement detection apparatus according to the fourth exemplary embodiment of the present invention.
Figure 29A:
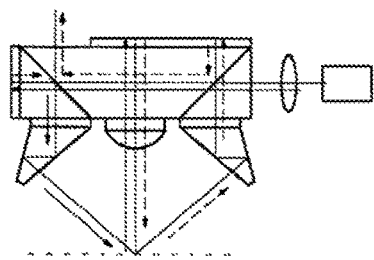
FIGS. 29A-29D are explanatory views illustrating the optical paths of the unnecessary light beam that reaches the light-receiving section in the displacement detection apparatus according to the fourth exemplary embodiment of the present invention.
Figure 29B:
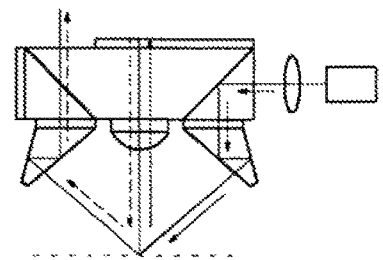
Figure 29C:
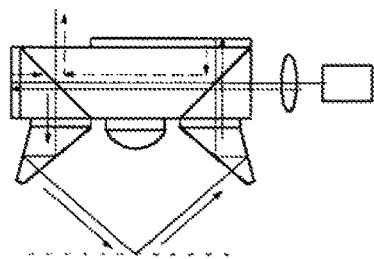
Figure 29D:
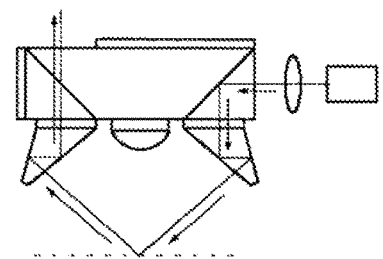

A displacement detection apparatus 80 of the example is an apparatus that detects a displacement in one direction of the diffraction grating, a displacement in the X direction in the case of FIG. 27. Hereinafter, the embodiment will be explained by the use of FIG. 27 and FIG. 28. In the following explanation, there will be omitted the explanation about a portion overlapping with the first exemplary embodiment.

A diverging light beam emitted from the light source 2 is converted to a collimate beam by the lens 11. The light beam converted to the collimate beam enters a luminous flux-splitting section including a polarizing beam splitter 91a. The position and type of the light source 2 and the polarization direction of the light beam in entering the polarizing beam splitter 91a are similar to those of the first exemplary embodiment.

The beam from the light source is split by the polarizing beam splitter 91a into the luminous flux 1 and the luminous flux 2 each having an equal intensity. The luminous flux 1 passes through a half-wave plate 92 to be converted from the S-polarized light beam to the P-polarized light beam, is then reflected by a prism 93, and enters the diffraction grating 4. The condition of the incident angle is similar to that of the first embodiment.

The luminous flux 1 diffracted by the diffraction grating 4 passes through the lens 7, and enters a diffracted light-reflecting section including a quarter-wave plate 97 having a reflective plane provided in the rear surface thereof. The arrangement of the lens 7 is similar to that of the first exemplary embodiment. The luminous flux 1 reflected by the rear surface of the quarter-wave plate 97 is converted from the P-polarized light beam to the S-polarized light beam, and travels back through the optical path through which the luminous flux 1 originally traveled. The resulting luminous flux 1 is converted from the S-polarized light beam to the P-polarized light beam by the half-wave plate 92, and transmits through the polarizing beam splitter 91a, and enters the quarter-wave plate 97 having a reflective plane provided in the rear surface thereof and is reflected. The reflected luminous flux is converted from the P-polarized light beam to the S-polarized light beam, and is then

TABLE 2

|  | −1st order 0th order +1st order | +1st order 0th order −1st order | +1st order +1st order | −1st order −1st order | 0th order(1) | 0th order(2) |
|---|---|---|---|---|---|---|
| −1st order 0th order +1st order | — | −2ΔL | −ΔL + 2nL$_3$ | −ΔL + 2nL$_3$ | −2ΔL − 4nL$_3$ | −4nL$_3$ |
| +1st order 0th order −1st order | −2ΔL | — | ΔL + 2nL$_3$ | ΔL + 2nL$_3$ | −4nL$_3$ | 2ΔL − 4nL$_3$ |
| +1st order +1st order | −ΔL + 2nL$_3$ | ΔL + 2nL$_3$ | — | 0 | −ΔL − 2nL$_3$ | ΔL − (4n + 2)L$_3$ |
| −1st order −1st order | −ΔL + 2nL$_3$ | ΔL + 2nL$_3$ | 0 | — | −ΔL − 2nL$_3$ | ΔL − (4n + 2)L$_3$ |
| 0th order(1) | −2ΔL − 4nL$_3$ | −4nL$_3$ | −ΔL − 2nL$_3$ | −ΔL − 2nL$_3$ | — | 2ΔL |
| 0th order(2) | −4nL$_3$ | 2ΔL − 4nL$_3$ | ΔL − (4n + 2)L$_3$ | ΔL − (4n + 2)L$_3$ | 2ΔL | — | reflected by the polarizing beam splitter 91a, and is further reflected by a luminous flux-coupling section including a polarizing beam splitter 91b, and travels to the light-receiving section 8.

The luminous flux 2 having passed through the polarizing beam splitter 91a passes through the polarizing beam splitter 91b and is then reflected by a quarter-wave plate 96 having a reflective plane provided in the rear surface thereof, and is converted from the P-polarized light beam to the S-polarized light beam. The luminous flux 2 converted to the S-polarized light beam is reflected by the polarizing beam splitter 91b, passes through a dummy glass 95, and is then reflected by a prism 94 to enter the diffraction grating 4 at a predetermined angle. The incident angle is similar to that of the first exemplary embodiment.

There is used, for the dummy glass 95, a glass material that enables the optical path length to be the same as the half-wave plate 92 when the thickness of the dummy glass 95 is substantially the same as the half-wave plate 92.

The luminous flux 2 diffracted by the diffraction grating 4 passes through the lens 7, is reflected by the quarter-wave plate 97 having a reflective plane provided in the rear surface thereof, and is converted from the S-polarized light beam to the P-polarized light beam, and then travels back through the original optical path, passes through the dummy glass 95, passes through the polarizing beam splitter 91b, and is superimposed with the luminous flux 1 and enters the light-receiving section 8. The operations of the light-receiving section 8 and the relative-position detector 10 are similar to those of the first exemplary embodiment.

The polarizing beam splitter 91a, the polarizing beam splitter 91b, and the prisms 93 and 94 are arranged so that an optical path length $(L_4+L_9 \times 2+L_5+L_6+L_7)$ of the luminous flux 2 from the splitting plane of the polarizing beam splitter 91a to the reflective plane of the quarter-wave plate 97 having a reflective plane provided in the rear surface thereof becomes longer by $\Delta L$ than an optical path length $(L_1+L_2+L_3)$ of the luminous flux 1 from the splitting plane of the polarizing beam splitter 91a to a reflective plane of the quarter-wave plate 97 having the reflective plane provided in the rear surface thereof. Since the luminous flux 1 and the luminous flux 2 enter horizontally symmetrically with respect to the central axis of the lens 7, $L_1=L_5$, $L_2=L_6$, and $L_3=L_7$ are established, and thus $L_4+L_9 \times 2=\Delta L$ is established.

The polarizing beam splitter 91a, the quarter-wave plate 97, and the polarizing beam splitter 91b are arranged so that an optical path length $(L_8 \times 2+L_4)$ of the luminous flux 1 when the luminous flux 1 travels from the polarizing beam splitter 91a, is reflected by the rear surface of the quarter-wave plate 97, and reaches the polarizing beam splitter 91b, becomes $\Delta L$.

Accordingly, the optical path lengths of the luminous flux 1 and the luminous flux 2 when both the luminous flux is split by the polarizing beam splitter 91a, is then diffracted by the diffraction grating 4, and reaches the splitting plane of the polarizing beam splitter 91b, become equal to each other. $((L_1+L_2+L_3+L_8) \times 2+L_4=L_4+(L_9+L_5+L_6+L_7) \times 2)$.

In the fourth exemplary embodiment, light beams illustrated in FIGS. 29A-29D other than the luminous flux 1 and the luminous flux 2 reach the light-receiving section 8. Since the 2nd order light beam does not reach the light-receiving section as in the third exemplary embodiment, the noise of an interference signal is more suppressed than those in the first and second exemplary embodiments.

The optical path length difference between the respective diffracted light beams is given in Table 3.

It is possible to suppress interference other than the interference between the luminous flux 1 and luminous flux 2 by setting $\Delta L$ and $L_3$ as follows.

$$2\Delta L > \Delta l$$

$$|\Delta L - L_3| > \Delta l$$

$$|\Delta L - 2L_3| > \Delta l$$

$$4nL_3 > \Delta l$$

$$|2\Delta L - 4nL_3| > \Delta l$$

$$|\Delta L + 2(2n-1)L_3| > \Delta l$$

$$|\Delta L - 2(2n-1)L_3| > \Delta l \quad \text{[Formula 8]}$$

Where n is the number of times of reflection of the 0-th order light required until the corresponding diffracted light in the table sufficiently attenuates, and $\Delta l$ is the coherence length of a light source.

In the exemplary embodiment, since the number of times of reflection of the luminous flux 1 until it reaches the light-receiving section 8 is 11 and the number of times of reflection of the luminous flux 2 until it reaches the light-receiving section 8 is 9, the superimposed wave face becomes the same, unlike the first exemplary embodiment and as in the second and third exemplary embodiments.

Figure 30:
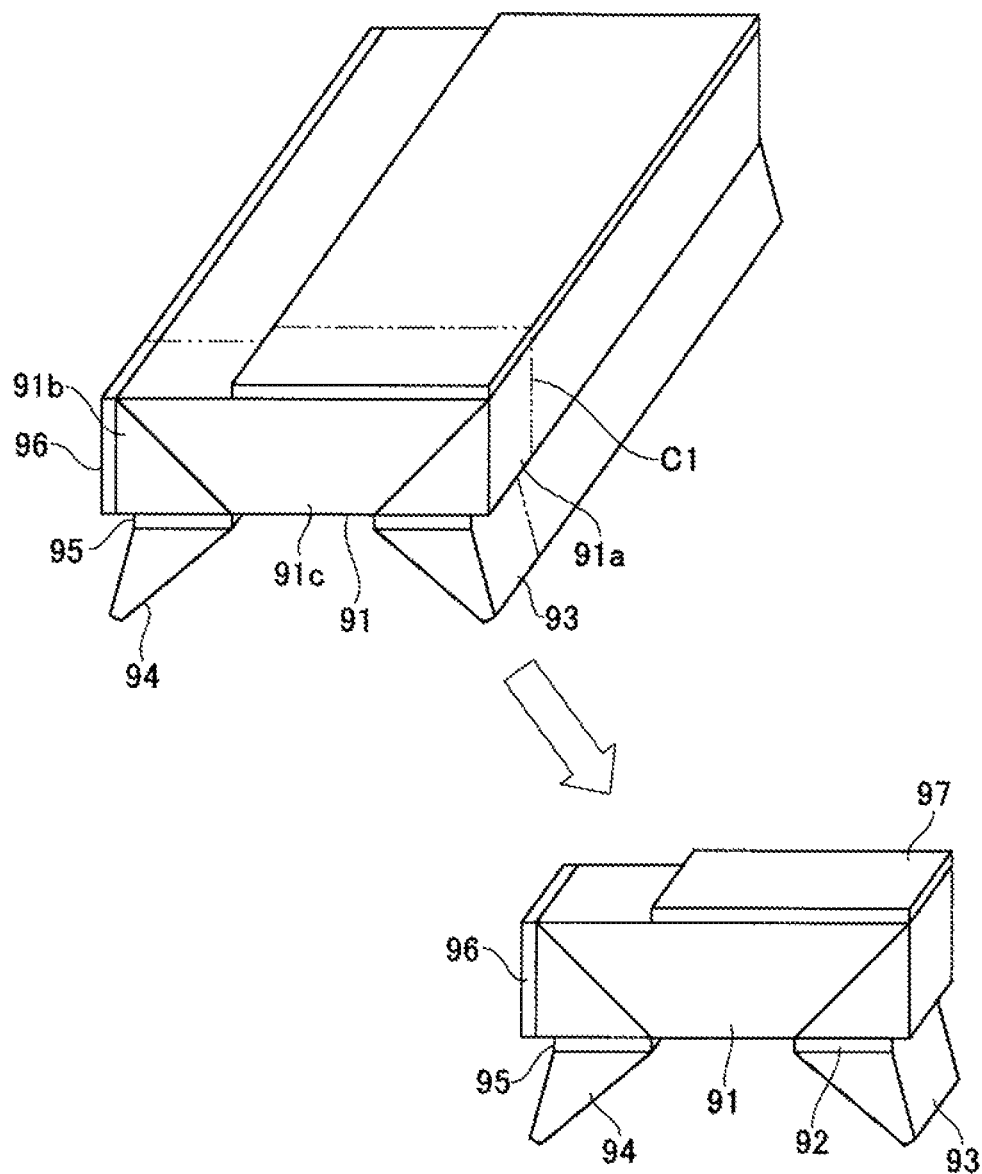
FIG. 30 is an explanatory view illustrating the method for manufacturing an optical system in the displacement detection apparatus according to the fourth exemplary embodiment of the present invention.

In the exemplary embodiment, the components other than the lens 7 are integrated as one component as illustrated in FIG. 27, and thus a component having a necessary thickness can be produced by being cutting out from a long component having these components integrated therein, as illustrated in FIG. 30, and the manufacturing cost can be reduced.

5. Fifth Exemplary Embodiment

Figure 31:
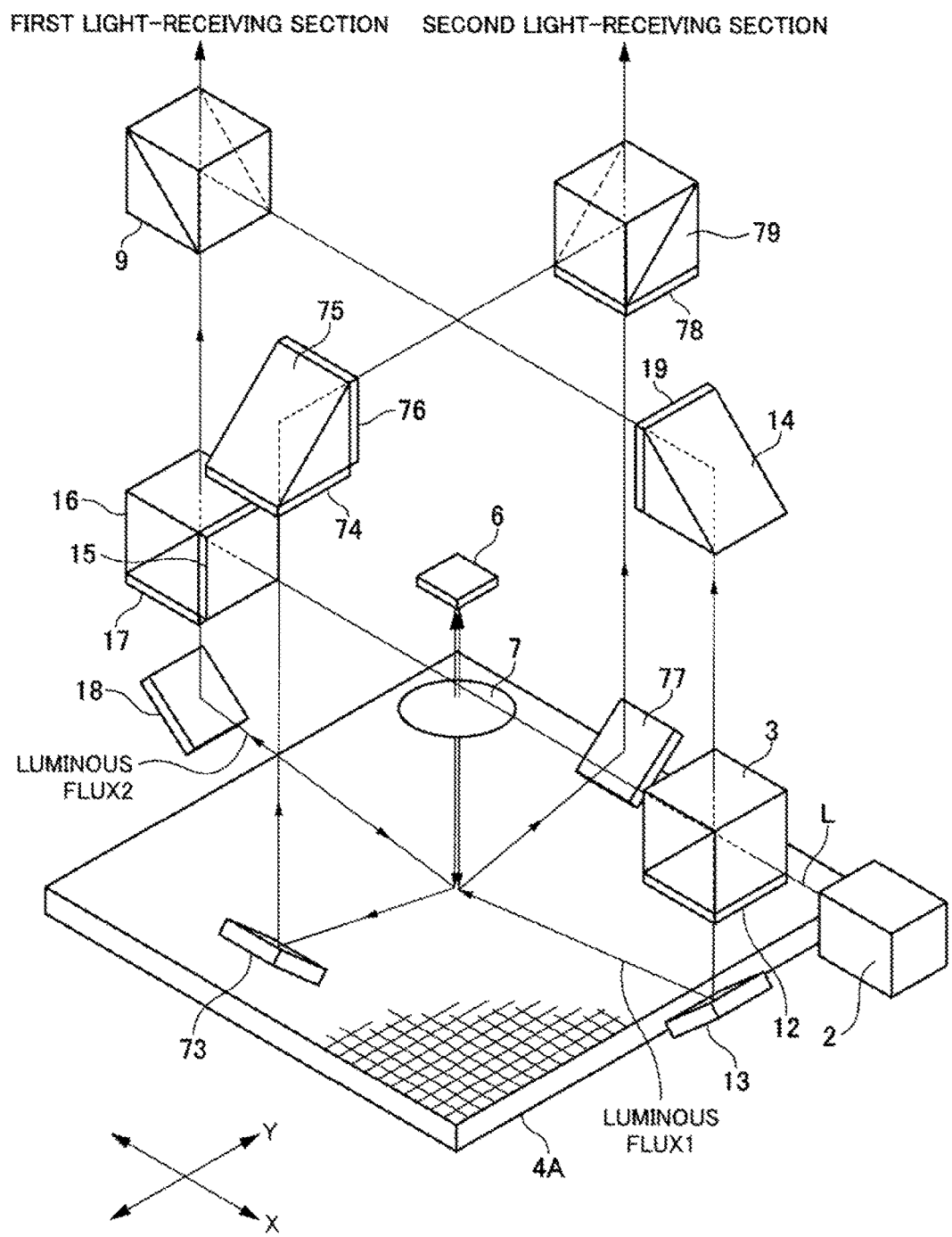
FIG. 31 is a perspective view schematically illustrating the configuration of a displacement detection apparatus according to a fifth exemplary embodiment of the present invention.

A displacement detection apparatus 70 of the example is an apparatus that simultaneously detects a displacement both in two directions of the diffraction grating, a displacement both in the X direction and the Y direction in the case of FIG. 31. The embodiment will be explained by the use of FIG. 31, FIG. 32, and FIGS. 33A and 33B.

Figure 32:
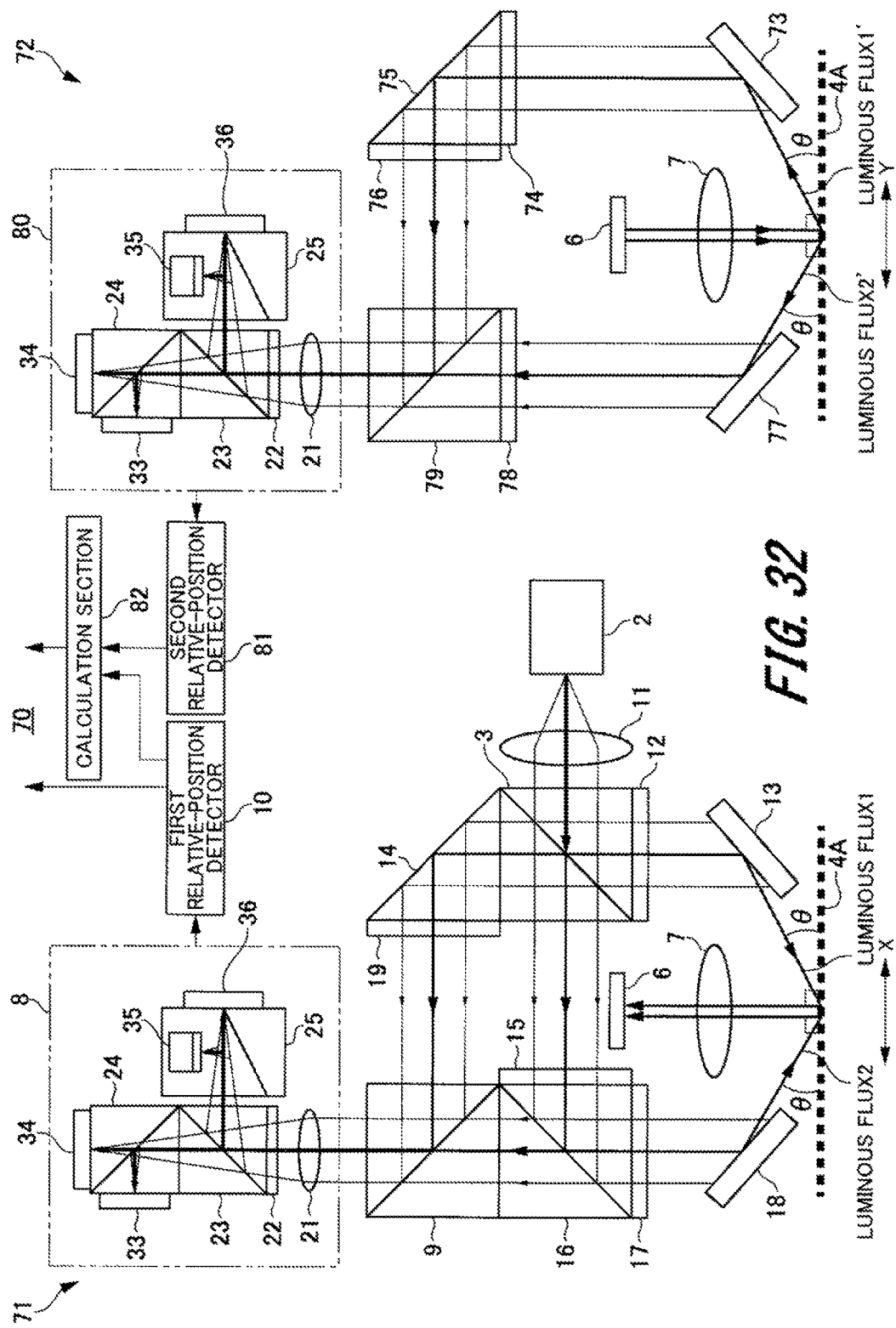
FIG. 32 is a schematic configuration diagram illustrating the configuration of the displacement detection apparatus according to the fifth exemplary embodiment of the present invention.
Figure 33A:
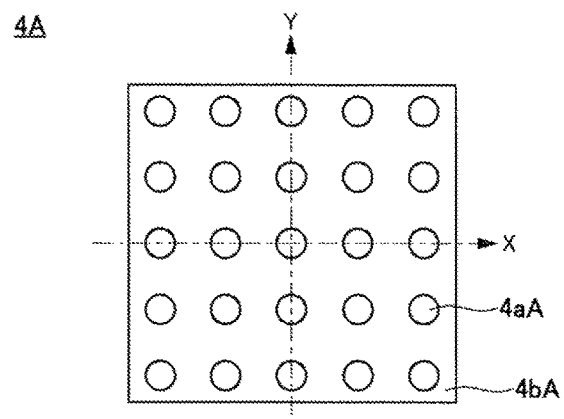
FIGS. 33A and 33B are diagrams illustrating an example of a diffraction grating in the displacement detection apparatus according to the fifth exemplary embodiment of the present invention.
Figure 33B:
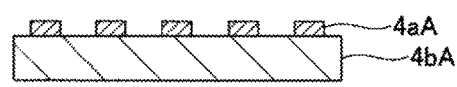

FIG. 31 is a perspective view illustrating the fifth exemplary embodiment as a whole, FIG. 32 is an optical-path view along the X direction and the Y direction, and FIGS. 33A and 33B is a view illustrating the structure of a diffraction grating 4A.

The displacement detection apparatus according to the fifth exemplary embodiment is an apparatus that simultaneously detects a two-dimensional displacement in the X direction and Y direction. The diffraction grating 4 has a structure in which cylindrical projections 4aA are arranged at an equal interval $\Lambda$ along the X-axis and the Y-axis on a

TABLE 3

|  | +1st order 0th order −1st order | −1st order 0th order +1st order | −1st order −1st order | +1st order +1st order | 0th order(1) | 0th order(2) |
|---|---|---|---|---|---|---|
| +1st order 0th order −1st order | — | $-2\Delta L$ | $L_3 - \Delta L$ | $L_3 - \Delta L$ | $-4nL_3$ | $-2(\Delta L - 2nL_3)$ |
| −1st order 0th order +1st order | $-2\Delta L$ | — | $\Delta L - 2nL_3$ | $\Delta L - 2nL_3$ | $2\Delta L - 4nL_3$ | $-4nL_3$ |
| −1st order −1st order | $L_3 - \Delta L$ | $\Delta L - 2nL_3$ | — | 0 | $-2(2n-1)L_3 - \Delta L$ | $-2(2n-1)L_3 + \Delta L$ |
| +1st order +1st order | $L_3 - \Delta L$ | $\Delta L - 2nL_3$ | 0 | — | $-2(2n-1)L_3 - \Delta L$ | $-2(2n-1)L_3 + \Delta L$ |
| 0th order(1) | $-2(\Delta L - 2nL_3)$ | $-4nL_3$ | $-2(2n-1)L_3 - \Delta L$ | $-2(2n-1)L_3 - \Delta L$ | — |  |
| 0th order(2) | $-4nL_3$ | $2\Delta L - 4nL_3$ | $-2(2n-1)L_3 + \Delta L$ | $-2(2n-1)L_3 + \Delta L$ | 0 | — | substrate 4bA, as illustrated in FIGS. 33A and 33B. The shape of the projection is not limited to the cylindrical shape, and may be another one. The cross-sectional shape of the projection structure 4aA is optimized so that the intensities of the +/−1st order diffracted light diffracted along the X-axis and Y-axis become the maximum.

The grating vector in the X-axis direction is denoted by $\vec{K}_1$ and the grating vector in the Y-axis direction is denoted by $\vec{K}_2$ where $$|\vec{K}_1|=2\pi/\Lambda \quad |\vec{K}_2|=2\pi/\Lambda$$

The optical path along the X-axis of the exemplary embodiment is completely the same as that of the first exemplary embodiment except that the diffraction grating 4 is only replaced by the diffraction grating 4A, as illustrated in a first optical system 71 of FIG. 32. In the light-receiving section 8, there is obtained an interference signal whose phase shifts by $4K_1\Delta x$ when the diffraction grating 4A is displaced by $\Delta x$ in the X-axis direction.

The optical path in the Y-axis direction, as illustrated in a second optical system 72, is an optical path in which there is utilized the +/−1st order diffracted light, along the Y-axis direction, generated when the +/−1st order diffracted light diffracted by the diffraction grating 4A is reflected by the mirror 6 and again enters the diffraction grating 4A in the optical path of the first optical system 71. The −1st order light (luminous flux 1'), which is the luminous flux 1 on the optical path of the first optical system 71 diffracted along the Y-axis direction, is reflected by a mirror 73 and then converted from the circularly-polarized light to the P-polarized light by a quarter-wave plate 74, and reflected by a mirror 75, and converted from the P-polarized light to the S-polarized light by a half-wave plate 76, and is then reflected by a second luminous flux-coupling section including a polarizing beam splitter 79, and travels toward a light-receiving section 80.

The +1st order light (luminous flux 2'), which is the luminous flux 2 of the first optical system 71 diffracted along the Y-axis direction, is reflected by a mirror 77, is converted from the circularly-polarized light to the P-polarized light by a quarter-wave plate 78, then passes through the polarizing beam splitter 79, and travels toward the light-receiving section 80.

The optical path of the luminous flux 1' to the mirror 73 and the optical path of the luminous flux 2' to the mirror 77 are set so as to be symmetric with respect to the central axis of the lens 7. Furthermore, the mirrors 73, 77, and 75 and the polarizing beam splitter 79 are arranged so as to satisfy $L_{10}'+\Delta L=L_8'+L_9'$. $\Delta L$ is set under the same conditions as those of the first exemplary embodiment.

The operation of the light-receiving section 80 is the same as that of the light-receiving section 8, but the phases that vary at the time of diffraction are not $+2Kx$ and $-2Kx$, but $+K_1x+K_2y$ and $-K_1x-K_2y$. Therefore, when the intensity of the interference light of the luminous flux 1' and the luminous flux 2' received by PD 33, 34, 35, and 36 of the light-receiving section 80 are respectively denoted by $I_{33'}$, $I_{34'}$, $I_{35'}$, and $I_{36'}$, then these are expressed as follows.

[Formula 9]
$$I_{33'} = \frac{1}{4}a^2\{1 + \mathrm{SIN}(2K_1x + 2K_2y + \delta)\}$$

$$I_{34'} = \frac{1}{4}a^2\{1 - \mathrm{SIN}(2K_1x + 2K_2y + \delta)\}$$

$$I_{35'} = \frac{1}{4}a^2\{1 + \mathrm{SIN}(2K_1x + 2K_2y - 90° + \delta)\} =$$

$$\frac{1}{4}a^2\{1 - \mathrm{COS}(2K_1x + 2K_xy + \delta)\}$$

$$I_{36'} = \frac{1}{4}a^2\{1 - \mathrm{SIN}(2K_1x + 2K_2y - 90° + \delta)\} =$$

$$\frac{1}{4}a^2\{1 + \mathrm{COS}(2K_1x + 2K_2y + \delta)\}$$

As described above, the interference light of the luminous flux 1' and the luminous flux 2' includes the phase information on both a displacement in the X-axis direction and a displacement in the Y-axis direction.

These interference signals are processed by a second relative-position detector 81, as in the first exemplary embodiment, and are further processed by a calculation section 82. In the calculation section 82, a displacement amount in the X-axis direction calculated by the first relative-position detector 10 is subtracted from the positional information of the second relative-position detector 81. At this time, the displacement amount only in the Y-axis direction is calculated by arithmetic processing (resolution differs between both cases) in consideration of the fact that the cycle of an interference signal on the optical path of the first optical system 71 with respect to the displacement in the X-axis direction is $\Lambda/4$ and that the cycle of an interference signal on the optical path of the second optical system 72 with respect to the displacement in the X-axis direction and the Y-axis direction is $\Lambda/2$.

As described above, in the fourth exemplary embodiment, displacements in both the two axis directions, i.e., X-axis direction and Y-axis direction, can be simultaneously detected with one light source. Accordingly, as compared with the case of arranging two apparatuses of the first exemplary embodiment corresponding to the X-axis and the Y-axis, respectively, the heat generation of the light source can be reduced by half and the influence of an individual drift generated by separately fixing the two apparatuses can be reduced.

As described above, there have been explained the exemplary embodiments in which two axes, i.e., the X-axis and the Y-axis, are orthogonal, but the two axes are not required to be orthogonal and the cycle $\Lambda$ of a diffraction structure may differ between the two axes.

Note that the present invention is not limited to the embodiments described above and illustrated in the drawings, but various modifications are possible within the scope not departing from the gist of the invention described in the claims. In the above-described exemplary embodiments, the light emitted from the light source may be supplied not only through gas but also through liquid or through vacuum space.

In addition, the displacement detection apparatuses according to the above-described exemplary embodiments can be applicable to various other types of displacement detection apparatuses such as a rotary encoder in which a diffraction grating rotates in parallel to the plane thereof, and a displacement detection apparatus that performs three-dimensional measurement in combination with a displacement detection apparatus that detects a displacement in the height direction.

Furthermore, in the displacement detection apparatuses according to the above-described exemplary embodiments, an example of using a reflection-type diffraction grating has been explained, but is not limited thereto, and there may be used a transmission-type diffraction grating through which the first luminous flux and the second luminous flux transmit.

Note that, in the specification, the terms such as "parallel" and "orthogonal" are used, but these do not mean only "strictly parallel" and "strictly orthogonal". Here, relevant elements may be in a "substantially parallel" state or "substantially orthogonal" state within a range in which the elements can exhibit the functions thereof, including a "parallel" state and "orthogonal" state.

REFERENCE SIGNS LIST 1 displacement detection apparatus
2 light source
3 polarizing beam splitter (luminous flux-splitting section)
4, 4A diffraction grating
4a grating
4aA projection
4b, 4bA substrate (grating plane)
6 mirror (diffracted light-reflecting section)
7 correcting lens
8 light-receiving section
9 polarizing beam splitter (luminous flux-coupling section)
10 relative-position detector
11 lens
13 first mirror
14 mirror (coupling mirror)
18 second mirror
19 half-wave plate (coupling-side phase plate)
22 quarter-wave plate (first light-receiving-side phase plate)
23 non-polarizing beam splitter
24 polarizing beam splitter
25 polarizing beam splitter
33, 34, 35, 36 photodiode
48 quarter-wave plate (optical-path adjustment section)
71 first optical system
72 second optical system
73 third mirror
77 fourth mirror
79 polarizing beam splitter (second luminous flux-coupling section)
80 second light-receiving section
81 second relative-position detector
82 calculation section

What is claimed is:

1. A displacement detection apparatus, comprising:
a light source configured to emit light;
a luminous flux-splitting section configured to split light emitted from the light source into a first luminous flux and a second luminous flux;
a diffraction grating configured to diffract the first luminous flux and the second luminous flux split by the luminous flux-splitting section;
a first mirror configured to cause the first luminous flux split by the luminous flux-splitting section to enter the diffraction grating at a predetermined angle;
a second mirror configured to cause the second luminous flux split by the luminous flux-splitting section to enter the diffraction grating at a predetermined angle;
a diffracted light-reflecting section configured to reflect the first luminous flux and the second luminous flux diffracted by the diffraction grating, and to cause the same to enter again the diffraction grating;
a correcting lens arranged between the diffracted light-reflecting section and the diffraction grating;
a luminous flux-coupling section configured to superimpose the first luminous flux and the second luminous flux which are diffracted again by the diffraction grating; and
a light-receiving section configured to receive interference light beam of the first luminous flux and the second luminous flux superimposed by the luminous flux-coupling section, wherein
the diffracted light-reflecting section has a reflective plane arranged parallel to a grating plane of the diffraction grating, and wherein
the correcting lens is arranged so that a central axis thereof becomes perpendicular to the grating plane of the diffraction grating.

2. The displacement detection apparatus according to claim 1, wherein a direction of first-time diffraction of each of the first luminous flux and the second luminous flux in the diffraction grating is directed perpendicular to the grating plane.

3. The displacement detection apparatus according to claim 1, wherein one focus position in the correcting lens is located on the grating plane and another focus position in the correcting lens is located on the reflective plane of the diffracted light-reflecting section.

4. The displacement detection apparatus according to claim 1,
wherein an optical path length of the first luminous flux from the luminous flux-splitting section to the diffraction grating and an optical path length of the second luminous flux from the luminous flux-splitting section to the diffraction grating are set different, and
wherein an optical path length of the first luminous flux from the luminous flux-splitting section to the luminous flux-coupling section and an optical path length of the second luminous flux from the luminous flux-splitting section to the luminous flux-coupling section are set equal.

5. The displacement detection apparatus according to claim 4, wherein a length of an integral multiple of an optical path length difference that is a difference between an optical path length of the first luminous flux from the luminous flux-splitting section to the diffraction grating and an optical path length of the second luminous flux from the luminous flux-splitting section to the diffraction grating, a length of an integral multiple of an optical path length from the diffraction grating to the diffracted light-reflecting section, a sum of an integral multiple of the optical path length difference and an integral multiple of the optical path length from the diffraction grating to the diffracted light-reflecting section, and a difference between an integral multiple of the optical path length difference and an integral multiple of the optical path length from the diffraction grating to the diffracted light-reflecting section are set equal to or greater than a coherence length of the light source.

6. The displacement detection apparatus according to claim 4, wherein a length of an integral multiple of an optical path length difference that is a difference between an optical path length of the first luminous flux from the luminous flux-splitting section to the diffraction grating and an optical path length of the second luminous flux from the luminous flux-splitting section to the diffraction grating, a length of an integral multiple of an optical path length from the diffraction grating to the diffracted light-reflecting section, a sum of an integral multiple of the optical path length difference and an integral multiple of the optical path length from the diffraction grating to the diffracted light-reflecting section, and a difference between an integral multiple of the optical path length difference and an integral multiple of the optical path length from the diffraction grating to the diffracted light-reflecting section are set, when the light source has a plurality of interference peaks, equal to a length between the plurality of interference peaks, or to a length at which the interference peak is not generated.

7. The displacement detection apparatus according to claim 4, further comprising an optical-path adjustment section arranged on at least one of an optical path of the first luminous flux and an optical path of the second luminous flux and configured to adjust an optical path length of the first luminous flux or an optical path length of the second luminous flux.

8. The displacement detection apparatus according to claim 1, wherein a number of times of reflection of the first luminous flux from the luminous flux-splitting section to the light-receiving section and a number of times of reflection of the second luminous flux from the luminous flux-splitting section to the light-receiving section are identical or a difference therebetween is an even number.

9. The displacement detection apparatus according to claim 1, wherein the diffraction grating has a first grating vector along one direction of a grating array and a second grating vector along another direction of the grating array, the displacement detection apparatus further comprising:

a third mirror configured to reflect, when the first luminous flux is diffracted along the first grating vector by the diffraction grating, is caused to enter again the diffraction grating by the diffracted light-reflecting section, and is again diffracted by the diffraction grating, a third luminous flux generated along the second grating vector;

a fourth mirror configured to reflect, when the second luminous flux is diffracted once along the first grating vector by the diffraction grating, is caused to enter again the diffraction grating by the diffracted light-reflecting section, and is again diffracted, a fourth luminous flux generated along the second grating vector;

a second luminous flux-coupling section configured to superimpose the third luminous flux reflected by the third mirror and the fourth luminous flux reflected by the fourth mirror; and a second light-receiving section configured to receive interference light of the third luminous flux and the fourth luminous flux superimposed by the second luminous flux-coupling section.

* * * * *